Jan. 5, 1960     C. NEWSTEAD ET AL     2,919,632
PROFILING MACHINES

Filed Feb. 3, 1958     16 Sheets-Sheet 3

INVENTORS
Charles Newstead
Henry Thomas Smith
Gordon Hughes Griffiths
BY
AGENT

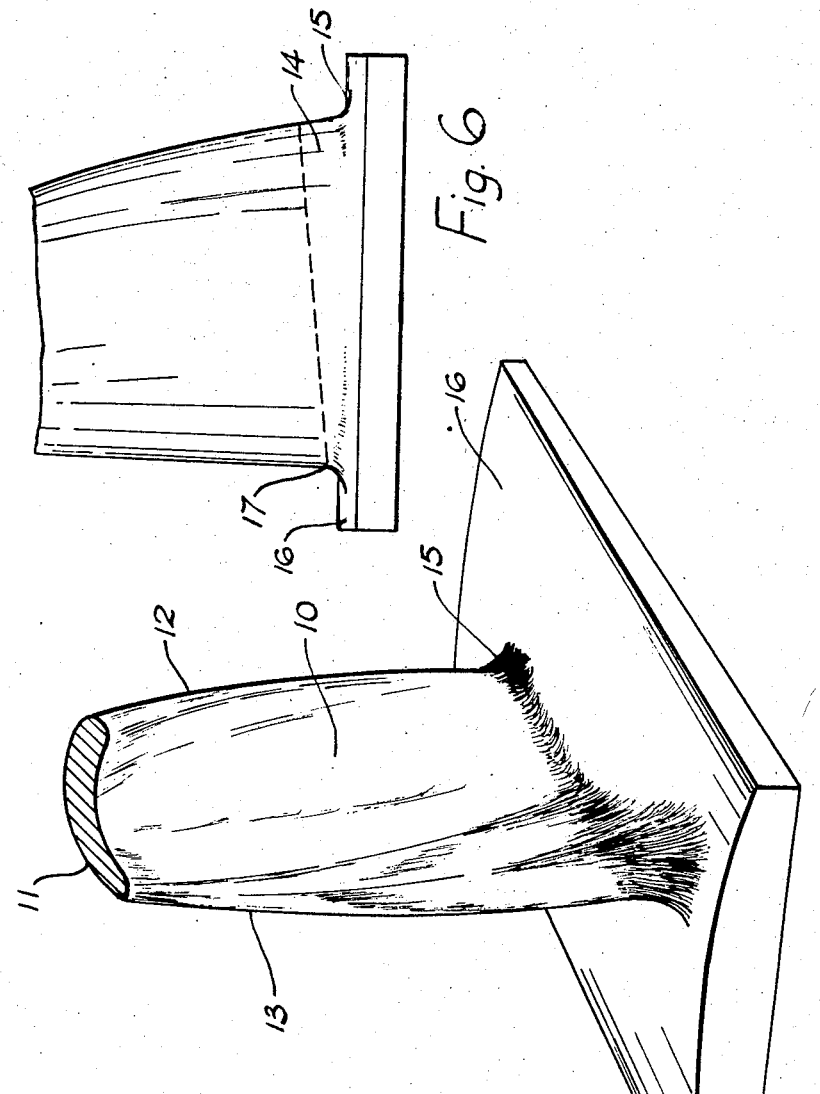

Jan. 5, 1960   C. NEWSTEAD ET AL   2,919,632
PROFILING MACHINES
Filed Feb. 3, 1958   16 Sheets-Sheet 5

INVENTORS
Charles Newstead
Henry Thomas Smith
Gordon Hughes Griffiths
BY

AGENT

Jan. 5, 1960

C. NEWSTEAD ET AL 2,919,632

PROFILING MACHINES

Filed Feb. 3, 1958

INVENTORS
Charles Newstead
Henry Thomas Smith
Gordon Hughes Griffiths

BY

AGENT

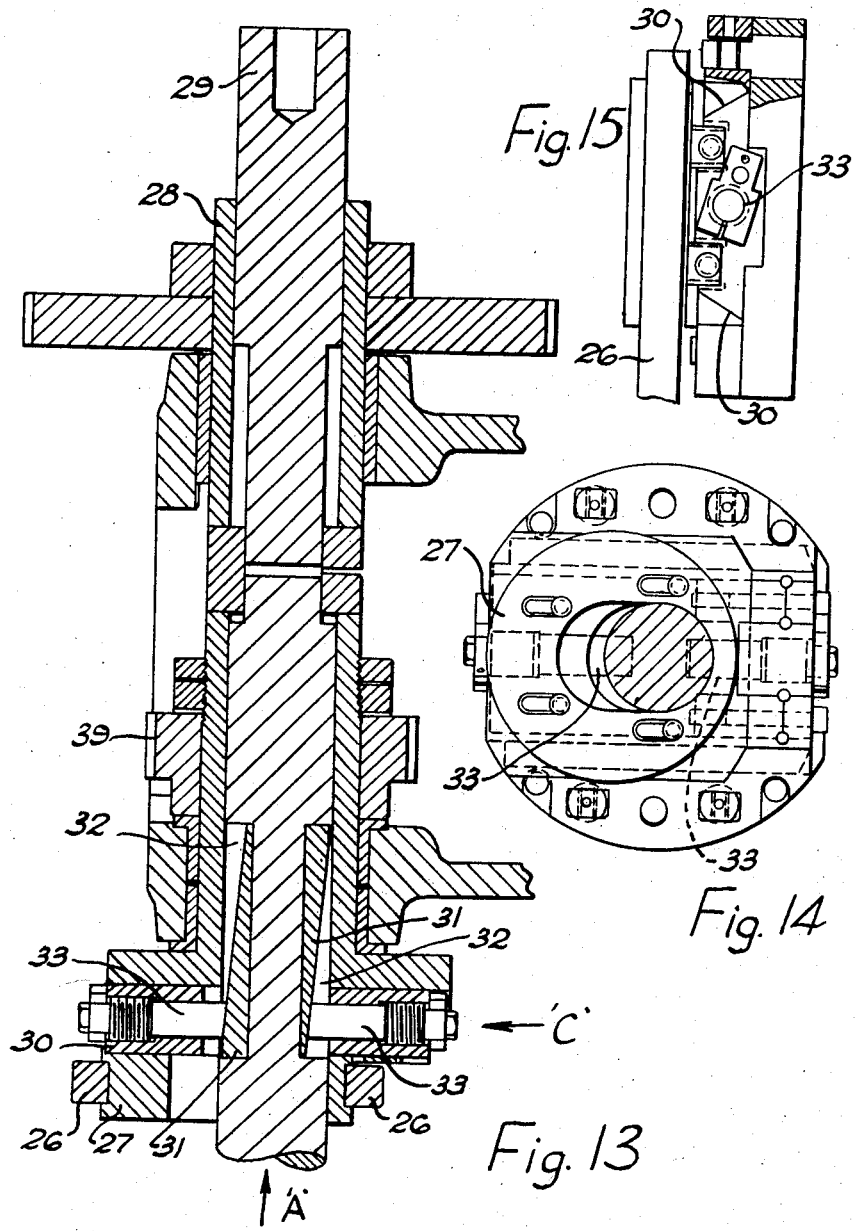

Jan. 5, 1960 — C. NEWSTEAD ET AL — 2,919,632
PROFILING MACHINES
Filed Feb. 3, 1958 — 16 Sheets-Sheet 13

INVENTORS
Charles Newstead
Henry Thomas Smith
Gordon Hughes Griffiths
BY
AGENT

Jan. 5, 1960     C. NEWSTEAD ET AL     2,919,632
PROFILING MACHINES
Filed Feb. 3, 1958     16 Sheets-Sheet 14
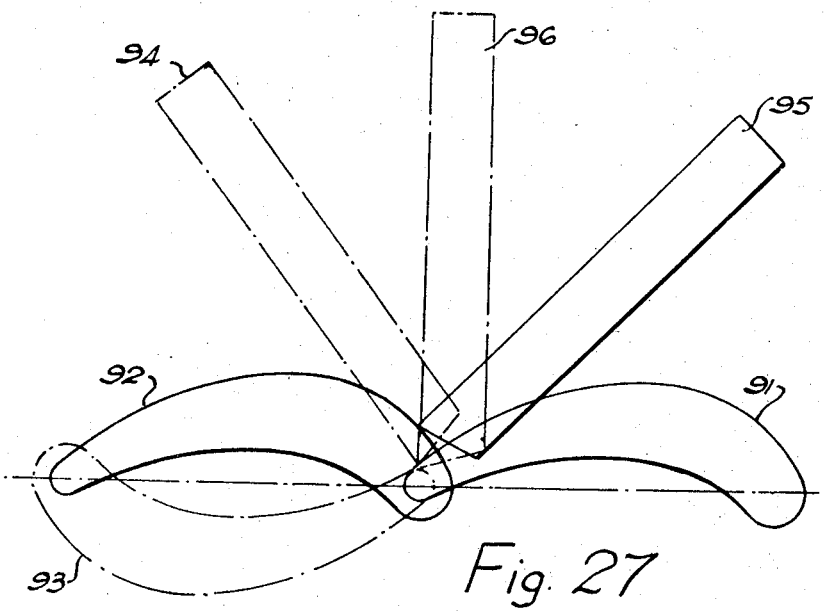
Fig. 27
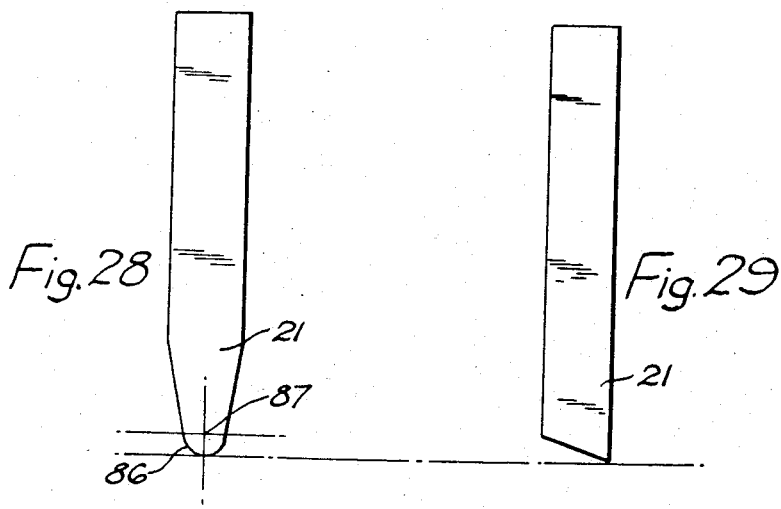
Fig. 28     Fig. 29
INVENTORS
Charles Newstead
Henry Thomas Smith
Gordon Hughes Griffiths
BY 
AGENT

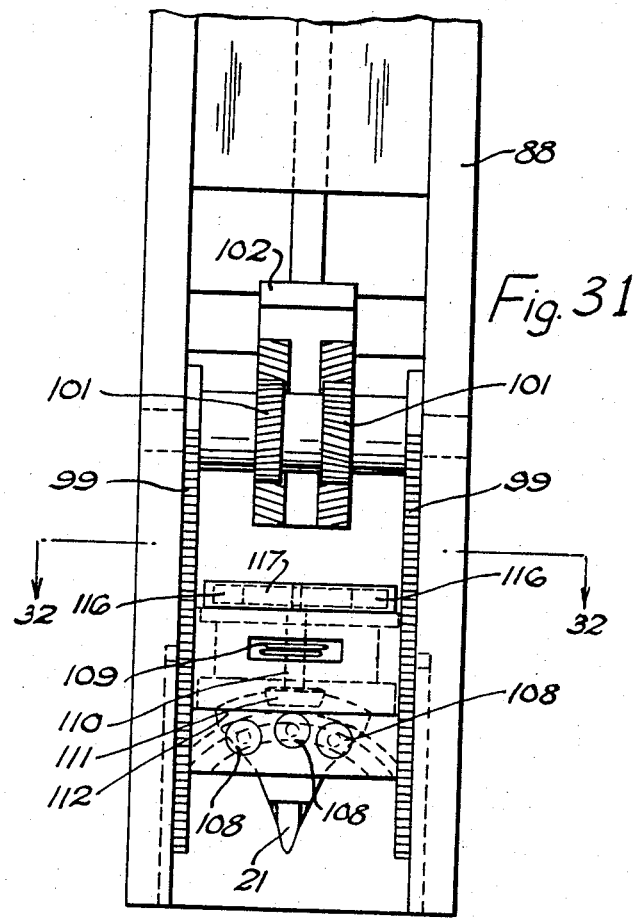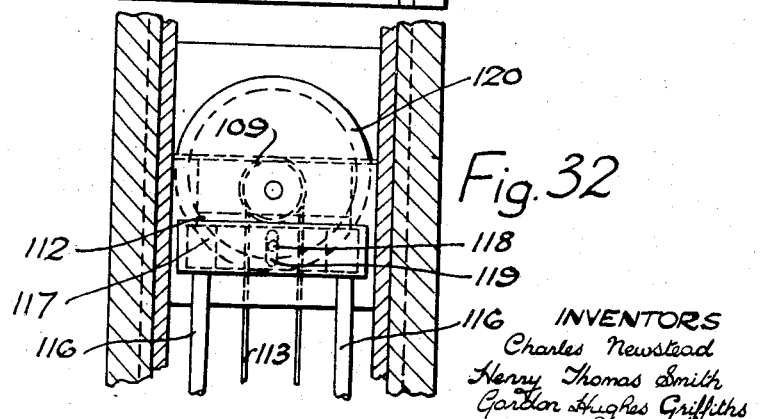

United States Patent Office 2,919,632
Patented Jan. 5, 1960

2,919,632
PROFILING MACHINES

Charles Newstead, Walsall, Henry T. Smith, Four Oaks, Sutton Coldfield, and Gordon H. Griffiths, Aldridge, England, assignors to B.R.D. Company Limited, Aldridge, Stafford, England, a British company Application February 3, 1958, Serial No. 712,812

Claims priority, application Great Britain February 9, 1957

7 Claims. (Cl. 90—24.3)

This invention relates to profiling machines for forming and/or finishing work-pieces (hereinafter referred to as blanks) of relatively complex shapes which may be asymmetrical and which may include at least one surface which is of curved configuration.

Although it is envisaged that a machine constructed in accordance with the present invention will be adapted to machine turbine blades, it is to be understood that the machine need not necessarily be restricted to such an application alone.

Considering, however, a turbine blade, although blades for steam turbines have been made in large quantities for some considerable time, the advent of the aero-engine gas turbine has meant a greatly increased demand for turbine blades. Further, the present emphasis on the axial-flow jet engine as opposed to the radial-flow engine has meant that many more turbine blades are required than was formerly the case.

The conditions of service of blades used in a gas turbine are such that extremely tough materials have to be used and it is not easy to form such materials to the desired shape, which shape is an extremely complex one, involving as it may root and tip platforms in addition to the aerofoil section of the blade. Consequently, a great amount of effort has been expended in the development of various alternative methods of manufacturing such turbine blades and prominent among these methods are those of precision forging, precision casting, and machining. Each of these methods possesses certain advantages and disadvantages when compared with the others and each method is in fact used at present in the production of gas turbine blades.

One of the factors which influence the choice of manufacturing method is the degree of tolerance called for in the dimensions of the finished blade and as such tolerances become smaller and smaller it is probable that the machining of blades, at least in their final stages, will prove to be the most economical method.

It is therefore one object of the present invention to provide a new or improved profiling machine which, whilst being adapted to machine articles of complex and asymmetrical configuration, is adapted to machine in particular a gas turbine blade over the whole of its aerofoil section, in addition to a major portion of the tip and root platforms where provided.

A further object of the present invention is to provide a profiling machine adapted to machine turbine blades wherein the machine may be easily and quickly adapted to machine different blades of varying characteristics.

Yet a further object of the present invention is to provide an arrangement in which the shape of the blade machined can be varied as the machine is running and as a machining tool traverses along the length of the blade.

Another object of the present invention is to provide a machine adapted to machine a turbine blade wherein said blade is broken down into a number of separate characteristics, each separately and independently controllable as the machine is running.

In accordance with one aspect of the present invention we provide a method of machining an elongated work-piece (hereinafter referred to as a blank) having two or more sides connected together by edge portions of curved configuration comprising the steps of effecting a translational movement of the blank in a direction transverse to its length with a machining tool in contact with a first side of the blank from a first edge portion to a second adjacent edge portion so as to machine said side, rotating the blank about an axis transverse to said direction of translation with the tool in machining contact with said second edge portion from the end of said first side to the beginning of the second adjacent side and repeating the alternate steps of translational movement and rotational movement to complete a cycle in which the blank and tool are brought into machining contact with each other around the whole periphery of the blank, and traversing the tool along the length of the blank as such cycles of movement of the blank are carried out.

A profiling machine for machining a work-piece (hereinafter referred to as a blank) and constructed in accordance with another aspect of the present invention comprises a blank mounting slide, a tool carrying slide, means for traversing said tool carrying slide in one direction, means for effecting translational movement of said blank mounting slide in a second direction extending transversely of the direction of traverse of said tool carrying slide and means for effecting rotational movement of said blank mounting slide at the end of each stroke of said translational movement, said rotational movement being effected about an axis which is parallel or substantially parallel to said direction of traverse of the tool carrying slide.

In a preferred arrangement a profiling machine for machining a turbine blade or similar elongated article (hereinafter referred to as a blank) comprises a pair of spaced blank mounting slides adapted to support opposite ends of the blank, a tool carrying slide, means for traversing said tool carrying slide between the pair of blank mounting slides in a direction parallel to the length of the blank, means for effecting simultaneous translational movement of said blank mounting slides in a direction which extends at right angles or substantially at right angles to the length of said blank and means for effecting simultaneous rotational movement of said blank mounting slides at the end of each stroke of translational movement through substantially half a complete revolution about an axis which is parallel or substantially parallel to the length of the blank.

Other elongated articles similar to turbine blades may include, for example, compressor blades.

Although it is envisaged that the tool carrying slide as above mentioned is adapted to carry a cutting tool such as a single point cutting tool mounted stationarily in the slide, it is to be understood that the word "tool" also includes other forms such as, for example, a die provided with an abrasive carrying endless belt for polishing and finishing a workpiece.

As above described, the blank mounting slide will undergo a number of intermittent rotations in each cycle of movement, these corresponding to the number of edge portions on the blank being machined, each rotation enabling one such edge portion to be machined. Thus, where the blank is of generally triangular configuration in cross section so as to have three sides and three edge portions joining the pairs of adjacent sides, the blank mounting slide or slides would be rotated through an angle of 120° between each successive pair of translational movements.

As applied to the manufacture of turbine blades, however, the blank would have two sides (corresponding to the convex and concave sides of the aerofoil section), such sides being joined together at their ends by the leading edge section and the trailing edge section.

Preferably the arrangement is such that the or each blank mounting slide is positively locked against rotation whilst it is undergoing its translational movement and conversely is positively locked against translation whilst it is rotating. Thus the motion of the or each blank mounting slide may be divided into four distinct parts which make up a cycle of movement. These parts are, firstly, a translational movement, secondly, a rotation through substantially half a revolution, thirdly, a further translational movement, and fourthly, a further rotation through substantially half a revolution to complete the cycle, at which time the blank mounting slide is restored to its original position and orientation.

Thus, the basic elongated cross sectional shape of the aerofoil section of a turbine blade can be machined if the tool is kept in contact with the blank, said tool assuming a shaping action whilst the blank is undergoing its two translational movements and assuming a turning action whilst the blank is being rotated.

The complex shape of the aerofoil section demands, however, several modifications to this basic elongated shape and it is necessary to give to such aerofoil section further characteristics which are hereinafter referred to as taper, eccentricity of taper, blade centralisation and twist, and the means for achieving such characteristics will be hereinafter described.

The invention will now be described with reference to the accompanying drawings wherein:

Figure 5 is a perspective view showing one form of turbine blade that can be machined by the machine shown in Figures 1, 2 and 3.

Figure 6 is a fragmentary side elevation of the blade shown in Figure 1.

Figure 13 is a sectional elevational view showing the mechanism for varying the length of the sliding movement of the blade.

Figure 14 is an end elevation of Figure 13 looking in the direction of arrow A.

Figure 15 is a fragmentary elevation of Figure 13 looking in the direction of arrow C.

Figure 27 is a schematic view depicting the necessity for giving the tool variable front rake as the blade is rotated.

Figures 28 and 29 are two elevational views showing one form of cutting tool adapted to be used in the machine.

Figure 31 is a front elevational view showing the tool mounting, and

Figure 32 is a fragmentary part sectional plan view taken on the line 32—32 of Figure 31.

Figure 1:
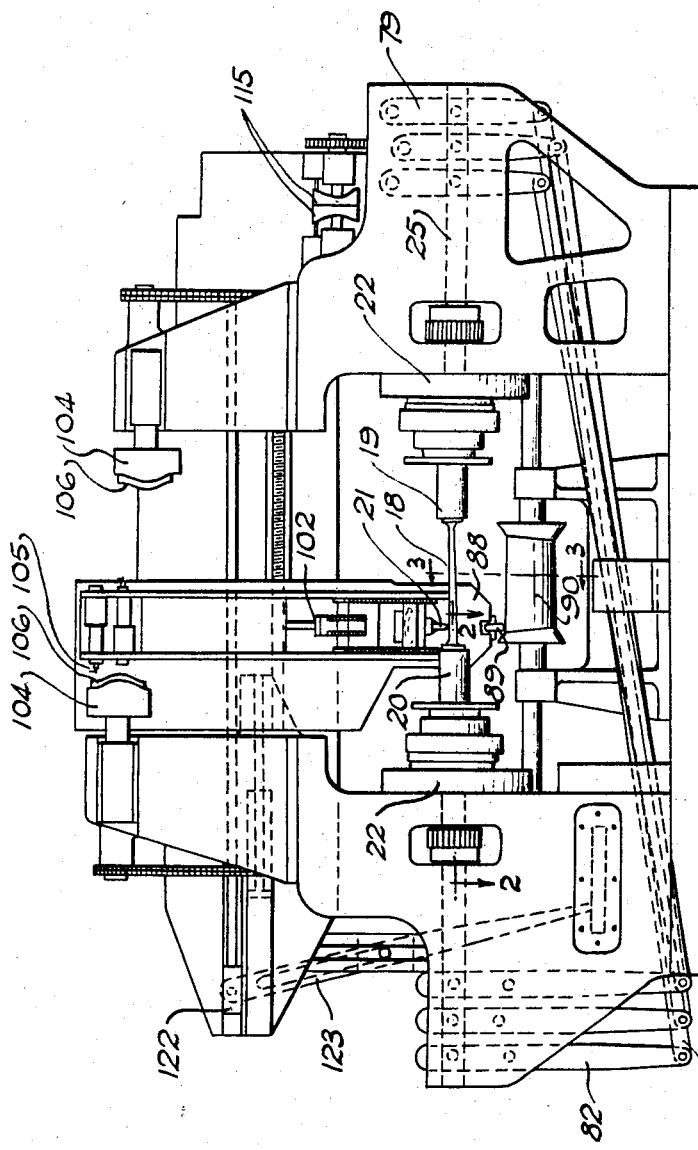
Figure 1 is a front elevational view showing a machine constructed in accordance with the present invention and adapted to machine a turbine blade such as is illustrated in Figures 5 and 6.
Figure 2:
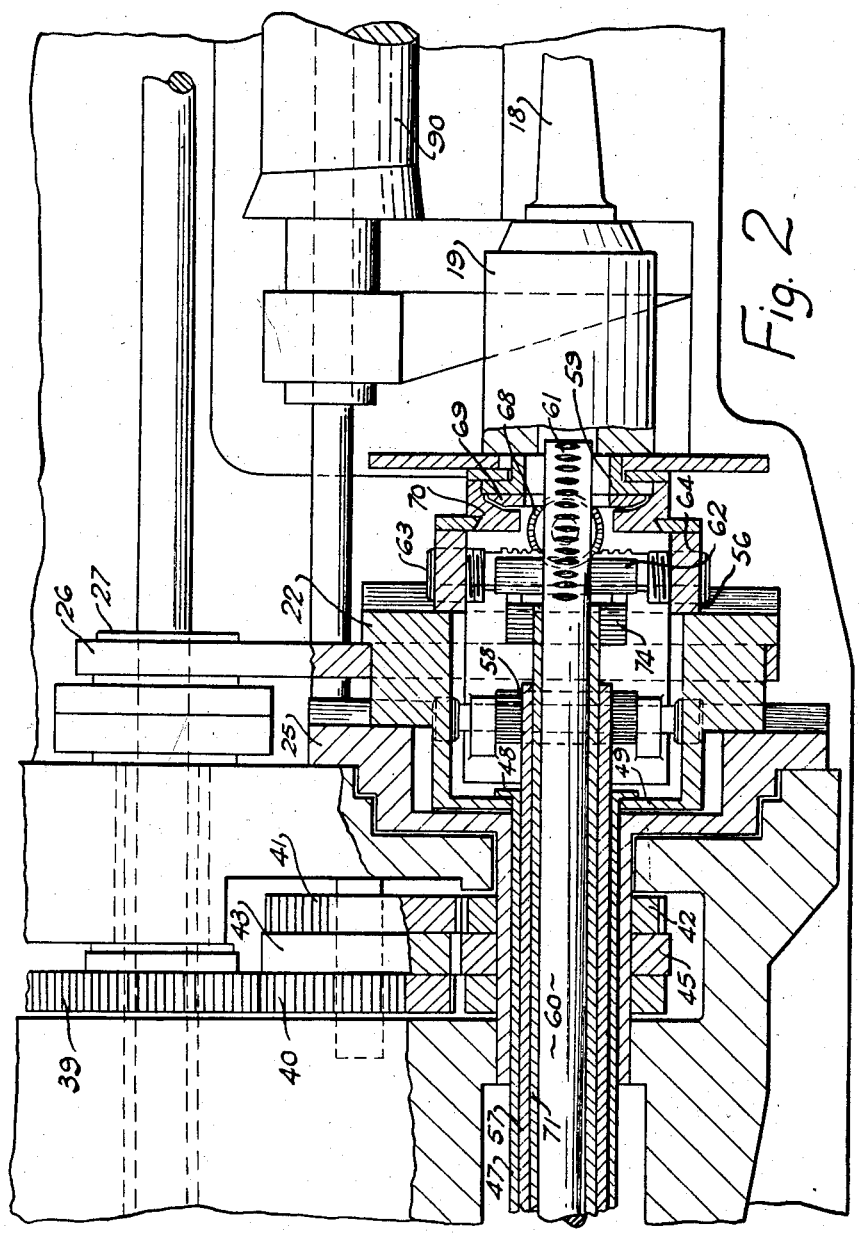
Figure 2 is a fragmentary sectional elevation taken on the line 2—2 of Figure 1 and on a somewhat larger scale.
Figure 3:
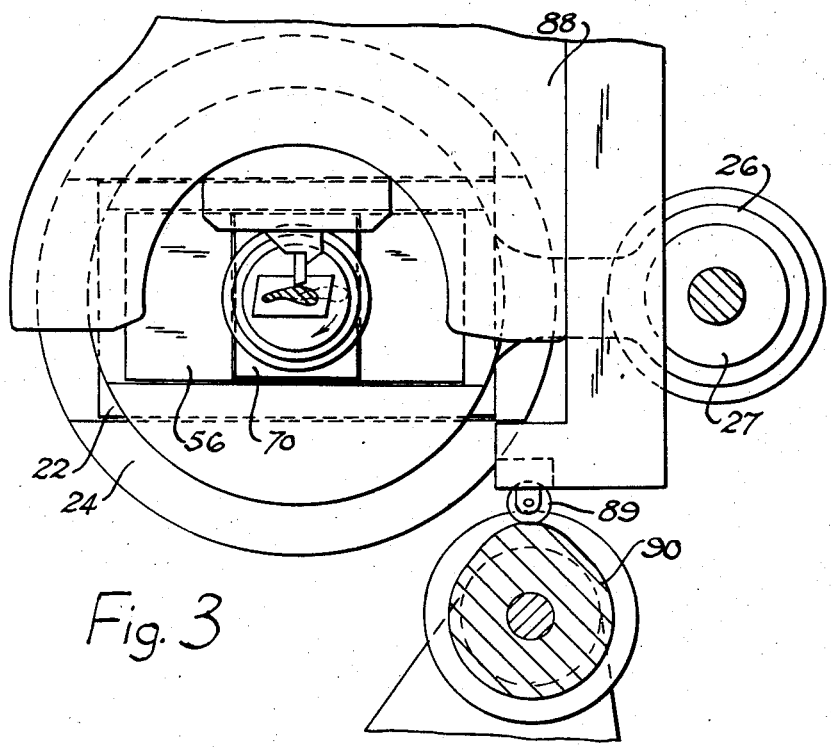
Figure 3 is a fragmentary sectional elevation taken on line 3—3 of Figure 1 and also on a somewhat larger scale.

A machine constructed in accordance with the present invention is illustrated in Figures 1, 2 and 3 and is adapted to machine gas turbine, steam turbine, and compressor blades and the like. As shown in Figure 1, a blade 18 is mounted between two heads 19 and 20 as to be adapted to be acted upon by a single point cutting tool 21. Thus the blade is supported from either end and the mounting arrangements at each end are the same. Thus, as will be seen more particularly in Figures 2 and 3, each end of the blade is connected to a main or blank mounting slide 22 capable of being reciprocated by means of the connecting rod 26 in a direction which is parallel to the width of the blade. Mounted on said blank mounting slide 22 is a further slide 56 which is reciprocable in a direction parallel to the direction of reciprocation of the slide 22. Yet a further slide 70 is mounted on slide 56 so as to be reciprocable in a direction generally at right angles to the motion of said slide 56 and between said slide 70 and the head or fixture in which the end of the blade is held is a rotatable face plate 59 adapted to be rotated about an axis parallel to the length of the blade.

The tool 21 is mounted in a slide 88 and adapted to be traversed along the length of the blade 18 and is also mounted in its slide for reciprocation in a vertical direction, such reciprocation being controlled by means of a follower 89 engaging a rotating barrel shaped cam 90.

Figure 4:
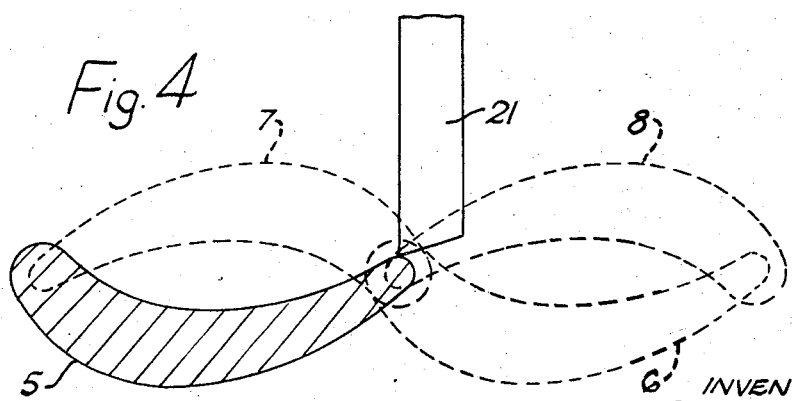
Figure 4 is a diagrammatic view showing the sequence of blade movements.

The blank mounting slide 22 is reciprocated as aforesaid by means of the connecting rod 26 connected to a main driving shaft 28, said slide 22 being mounted on a machine spindle 25 which is of hollow configuration. The arrangement is such that the main or blank mounting slide 22 undergoes a number of cycles of movement whilst the tool 21 is traversed along the length of the blade. In each cycle of movement, said slide 22 is given a rectilinear sliding motion by reason of its connection to the connecting rod 26; is then given a rotary motion through 180° by means of the gearing 39, 40, 41 and 42 (shown more particularly in Figures 8, 9, 10, and 11); a further rectilinear sliding motion in a direction opposite to the first rectilinear motion and then a further half-circular rotary motion through the mechanism of said gears 39, 40, 41 and 42. These four motions are illustrated by reference numerals 5, 6, 7 and 8 in Figure 4.

Movements are also imparted to the blade by means of the slides 56 and 70 and the rotatable face plate 59 controlled respectively by means of control rods 57, 71, and 60 passed through the centre of said hollow machine spindle 25.

The mechanism and operation of the machine will now be described more particularly in somewhat greater detail.

To this end and for convenience of description a typical blade may be provided into a number of areas which are to be machined. Such a blade is illustrated in Figures 5 and 6 and the areas concerned are as follows: (1) Root platform 16. (2) Root end fillet radius 15. (3) Root end triangle 14 (see Figure 6). (4) Aerofoil concave side 10. (5) Aerofoil convex side 11. (6) Leading edge 12. (7) Trailing edge 13. (8) Tip end triangle (not shown in Figures 5 and 6). (9) Tip end fillet radius (also not shown in Figures 5 and 6). (10) Tip platform (also not shown in Figures 5 and 6).

Although the blade shown in Figures 5 and 6 is provided with a root platform 16 only, it is to be understood that a blade machined by the machine constructed in accordance with the present invention may also have a corresponding tip platform provided at the other end of the blade. Further, the root end triangle 14 referred to is that area on each side of the blade lying between the root platform and an imaginary line drawn from one corner 17 of the blade across the blade substantially at right angles to its longitudinal axis.

To achieve machining of all the above mentioned areas it will be necessary to impart various movements both to the tool and to the blade and it will, therefore, be convenient, for the purposes of description, to consider movements of the tool and the blade separately. In this description the use of a single point tool similar to a shaping tool (see Figures 27 and 28) will be described, although it is to be understood that it is within the scope of the invention for the tool to be in other forms such as, for example, a rotating milling cutter or grinding wheel, or an abrasive polishing and finishing band suitably mounted and driven by means of a motor.

The motions imparted to the blade will now be described.

Blade movements

Considering firstly the aerofoil section of the blade, i.e. that portion of the blade lying between the root platform 16 and the tip platform where provided, it will be realised that the cross section of such aerofoil section is of somewhat elongated configuration as shown in Figure 5, which elongated configuration is formed in effect by two sides (i.e. the concave side 10 and the convex side 11 joined together at either end by the leading edge section 12 and the trailing edge section 13). Thus, if the whole surface of the aerofoil section is to be machined by a tool such as a single point cutting tool, as shown in Figures 27 and 28, it will be necessary to arrange relative motion between the blade and the tool so that the tool maintains contact with the surface of the blade around the whole periphery of the aerofoil section. Disregarding for the moment the additional complications introduced by the concave and convex forms on the aerofoil section and assuming the tool to be fixed, contact between the blade and the tool throughout the whole periphery of the aerofoil section can be achieved by means of firstly advancing the blade bodily in a direction parallel to its width in such a manner that the tool is caused to contact and thus machine one of the sides of the aerofoil section. At the end of this rectilinear or sliding motion the whole blade may then be rotated about the centre of curvature of, say, the leading edge 12 so as to maintain said leading edge in contact with the cutting point of the tool. In this way the blade will have been rotated through 180° and may then be moved bodily again in a direction parallel to its width but in an opposite sense to the sliding movement previously carried out so as to machine the other side of the blade. The blade may then be rotated about the centre of curvature of the trailing edge 13 with the tool being maintained in contact as before so that the blade is now disposed in its original position, the tool having been made in effect to travel around the whole periphery of the aerofoil section. Thus the movement of the blade may be divided into two straight line motions and two turning motions, the former giving rise to a shaping action by the tool and the latter to a turning action.

Thus, the basic movement given to the blade in order that the aerofoil section thereof can be machined comprises two rectilinear sliding motions and two turning motions through 180°. It is important during either of the sliding motions that the blade is positively prevented from turning and correspondingly during either of the turning motions it is essential that the blade is prevented from sliding. The mechanism by means of which the above described motions are given to the blade, together with the necessary locking arrangements, are now described as follows, it being understood that the blade is mounted in the machine so as to be supported from either end but as the mounting arrangements at each end will be the same, description of one end will suffice.

As seen in Figure 1, a blade 18 is mounted between two mounting heads 19 and 20 so as to be adapted to be acted on by the single point cutting tool 21.

Figure 7:
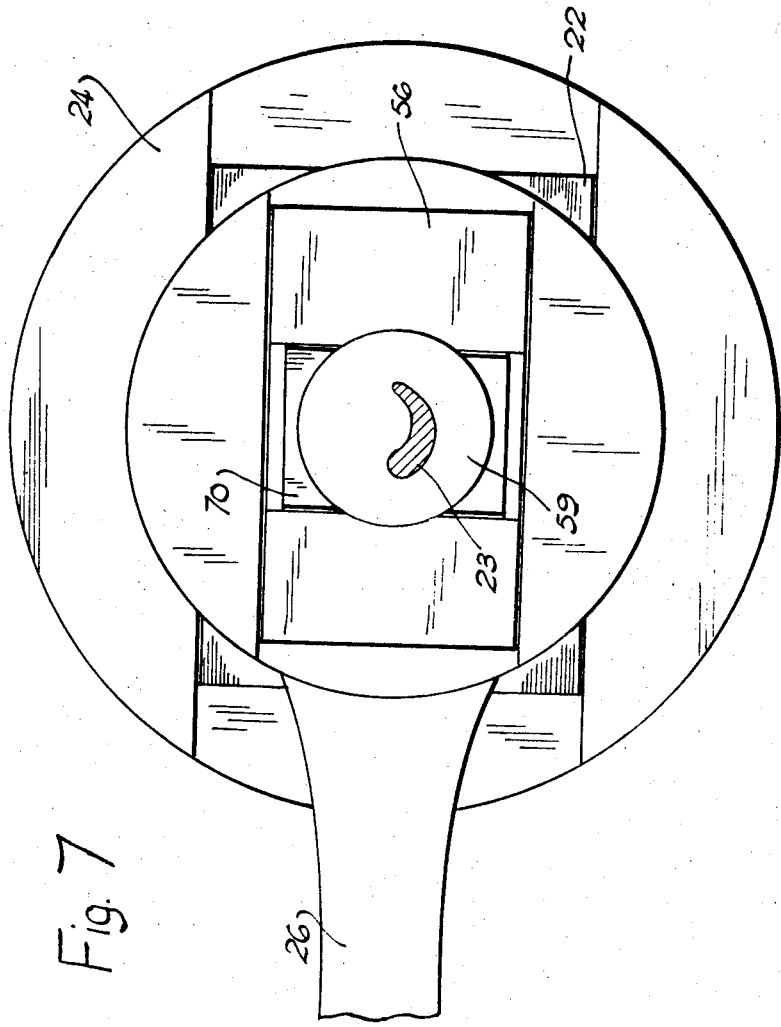
Figure 7 is a schematic elevational view showing one of the mountings for one end of the blade.
Figure 8:
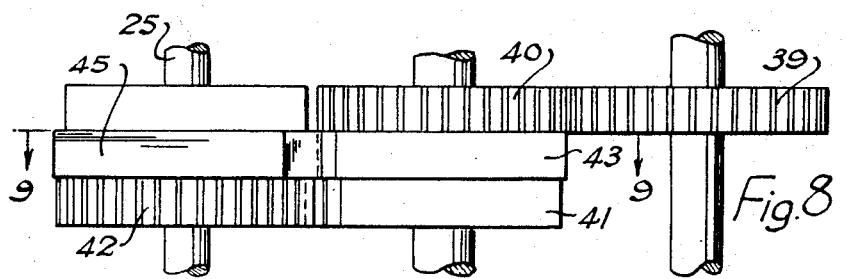
Figure 8 is a fragmentary elevational view showing a part of the mechanism of the machine whereby the blade is given intermittent rotation.

Each blade head is provided with a number of slides and these slides are depicted diagrammatically in Figure 7. Firstly the blade is connected to a main or blank mounting slide 22, the blade being held in its mounting in such an orientation that said slide 22 is adapted to move in a direction parallel to the width of the blade, the blade being diagrammatically indicated in Figure 7 by reference numeral 23. Said slide 22 is mounted on a face plate 24 which is concentrically arranged with respect to the axis of the machine spindle 25 (see Figure 1) and said slide 22 is adapted to be moved in its reciprocating motion by means of a connecting rod 26, the other end of which is connected to an eccentric or crank pin 27 (see Figure 12) mounted eccentrically on a main driving shaft 28 which is adapted to be driven in any convenient manner as, for example, from a reduction gear box and the connection between the aforementioned crank pin 27 and the main driving shaft on which it is mounted is such that the throw of said crank pin from the centre of said main driving shaft 28 is variable. Thus, if the throw is varied, then the stroke of the connecting rod and correspondingly the stroke of the main or blank mounting slide 22 will be varied also. The sliding motion of the slide 22 gives to the blade the rectilinear or straight line sliding motions above referred to and it will be realised that if the length of the stroke of the connecting rod 26 is varied as above indicated, then the machined width of the blade will vary also.

As it is necessary to arrange that the width (i.e. chord) of the blade can be varied along the length thereof, it will be necessary to vary the stroke of said slide 22 as the tool travels in its motion along the length of the aerofoil section of the blade in accordance with a predetermined design. Thus arrangements have to be made to vary the stroke of the slide 22 whilst the machine is running and to this end we provide said main driving shaft 28 with a control rod 29 which is passed through the hollow centre of said shaft 28 (see Figure 13). The annular crank pin 27 to which one end of the connecting rod 26 aforesaid is connected is itself mounted in a slide 30 so that movement of said slide 30 transverse to the main driving shaft will alter the position of the crank pin 27 and thus vary the eccentricity thereof. In this way variations in stroke of the slide 22 can be achieved.

To enable this variation to be effected whilst the machine is running, said control rod 29 is provided at one end with two opposite surfaces that are inclined to the axis of rotation of the main driving shaft. To this end there are provided a pair of wedges 31, each having one of the inclined surfaces aforesaid, and each being let into an axially extending recess 32 provided in the control rod 29. A pair of feelers or fingers 33 (each being adjustable as shown, by screw and nut means, in Figure 13) are provided so that the inner end of each finger 33 engages with one of the two inclined surfaces on the wedges 31. The fingers or feelers 33 are connected to the slide on which the crank pin 27 is mounted so that axial movement of the control rod 29 which respect to the main driving shaft in which it is mounted will cause the feelers or fingers 33 to be displaced to one side or the other of the axis of said driving shaft, thus varying the eccentricity of the crank pin 27 and altering the stroke of the slide 22.

In order to arrange for the necessary axial movement of said control rod 29, there is provided at that end of the control rod remote from the aforementioned wedges 31 a follower 34 which is adapted to engage with a suitable cam 35 (see Figure 18) mounted in a cam control slide 36, which slide is connected to the tool slide of the machine (as will hereinafter be described) so that as the tool traverses along the length of the aerofoil section the cam control slide 36 will be moved so as to cause the follower 34 and the associated control rod 29 to move in and out of the main driving shaft in a corresponding manner.

Figure 19:
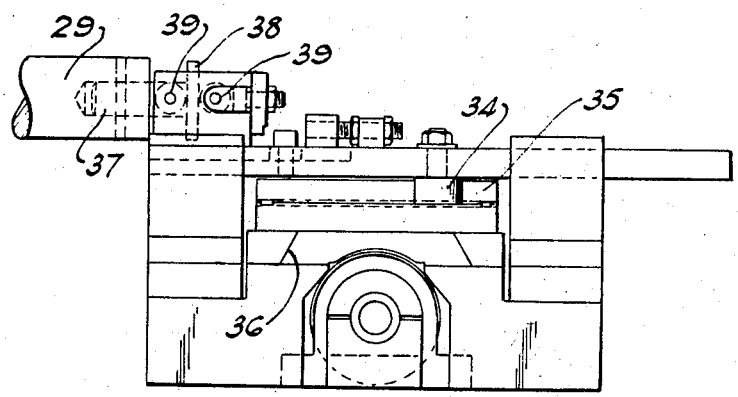
Figure 19 is an end elevational view looking in the direction of arrow B of Figure 18.
Figure 18:
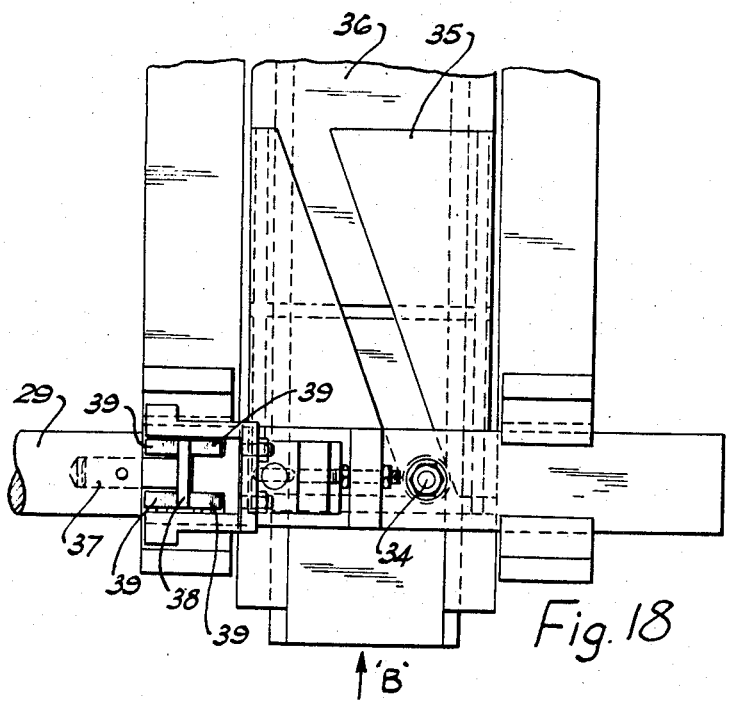
Figure 18 is a fragmentary plan view showing part of the cam control slide and connection between a cam therein to the control rod governing the length of stroke of the sliding motion of the blade.

As shown in Figures 18 and 19, the end of the control rod 29 is provided with an axially extending projection 37 having a terminal flange 38 which is trapped between two pairs of rollers 39, said rollers 39 being mounted on a member which is connected to the follower 34. Thus, as the tool traverses along the length of the aerofoil section, the eccentricity of the crank pin 27 to which the connecting rod 26 is attached will vary via the connection between the follower 34 and the cam 35, and the connection between the cam control slide 36 and the tool slide so that the stroke of the slide 22 will be varied, thus enabling the width of the blade to vary also.

Figure 9:
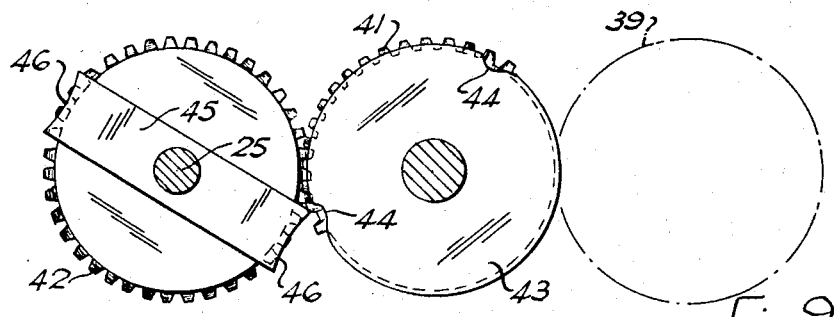
Figure 9 is a plan view taken on the line 9—9 of Figure 8.
Figure 10:
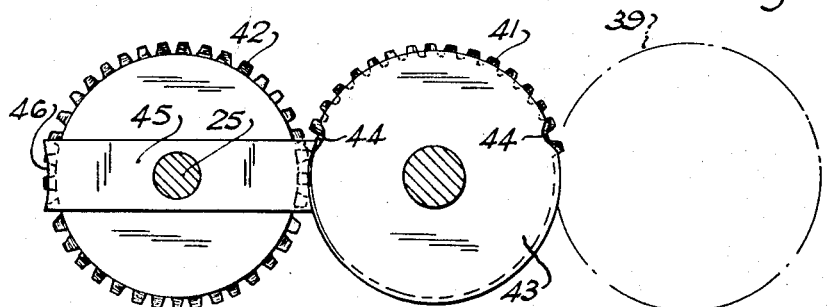
Figures 10 and 11 are further plan views similar to Figure 9 but with the gear wheels in different relative positions.
Figure 11:
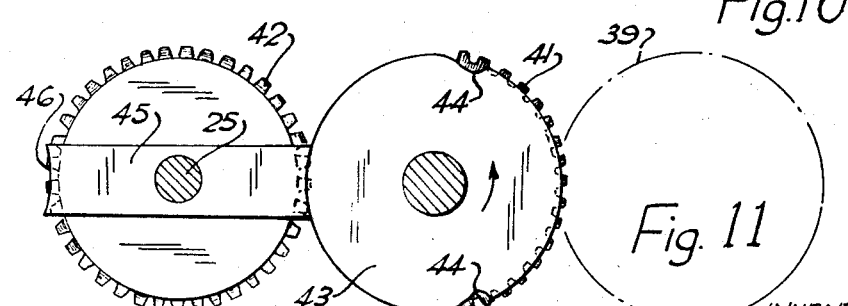

In addition to the intermittent sliding motions as above described, it is also necessary to impart intermittent turning motions to the blade. The mechanism by means of which this is achieved is depicted in Figures 8, 9, 10 and 11. Such mechanism comprises the main driving gear 39 driven from the main driving shaft 28 which is in mesh with an intermediate gear cluster via the intermediate gear 40, the two gears 39 and 40 being of equal diameter so that they rotate continuously together at equal speeds. The intermediate gear cluster is also provided with a mutilated gear 41 having teeth formed around half of its circumference, said mutilated gear being adapted to engage with a further full gear 42 provided on the machine spindle and arranged concentrically with the face plate to which the blade mounting is connected. Disposed between the intermediate gear 40 and the mutilated gear 41 is a key plate 43 which is of generally circular configuration formed to a diameter equal to the pitch circle diameter of the mutilated gear 41 and the other intermediate gear 40. Said key plate is, however, provided at two diametrically opposite positions with a cut-out 44, shaped as shown in Figures 9, 10 and 11 so as to form in effect a step at two positions in the circumference of the key plate. Mounted on the machine spindle 25 adjacent to the machine spindle gear 42 is a locking plate 45, which is secured to the machine spindle so as to rotate therewith. Said locking plate 45 has four sides, as seen in Figures 9, 10 and 11, one of the pairs of sides being straight and parallel and the other pair 46 being each formed to a curved configuration so as to present a surface which is concave outwards.

Each of said concave surfaces 46 is adapted to engage closely with the circumference of the key plate 43 where the latter is of circular configuration, the arrangement being that the configuration of each of the concave surfaces 46 follows generally the pitch circle of the mutilated gear 41. Thus, when the locking plate 45 is in contact with the major circular portion of the periphery of the key plate 43, said locking plate 45 is prevented from rotating whilst at the same time allowing the intermediate gear cluster to rotate. In this way the machine spindle 25 is prevented from rotation and this position is illustrated in Figure 11.

As the intermediate gear cluster continues to rotate in the direction indicated by the arrow in Figure 11, the mutilated gear 41 will be brought into mesh with the machine spindle gear 42. At this position one of the two cut-outs 44 on the key plate 43 engages with a corner of the locking plate 45 so as to enable the latter to rotate with the machine spindle gear 42 and thus disengage it from its locking position. This position is illustrated in Figure 10, in which the locking plate 45 is just commencing to disengage from the key plate 43. Rotation of the machine spindle gear 42 then continues through the 180° that it is in mesh with the mutilated gear 41, this position being illustrated by Figure 9. At the end of the 180° rotation the other end of the locking plate 45 will be brought into engagement with the periphery of the key plate 43 so that once again the machine spindle 25 will be locked against rotation. When the locking plate 45 is in its locking position with respect to the key plate 43, the relative disposition of the connecting rod 26 to which the slide 22 is connected is such that the aforementioned sliding motion of said slide 22 takes place. Thus, whilst said slide 22 is reciprocating the machine spindle 25 is positively locked against rotation.

Figure 12:
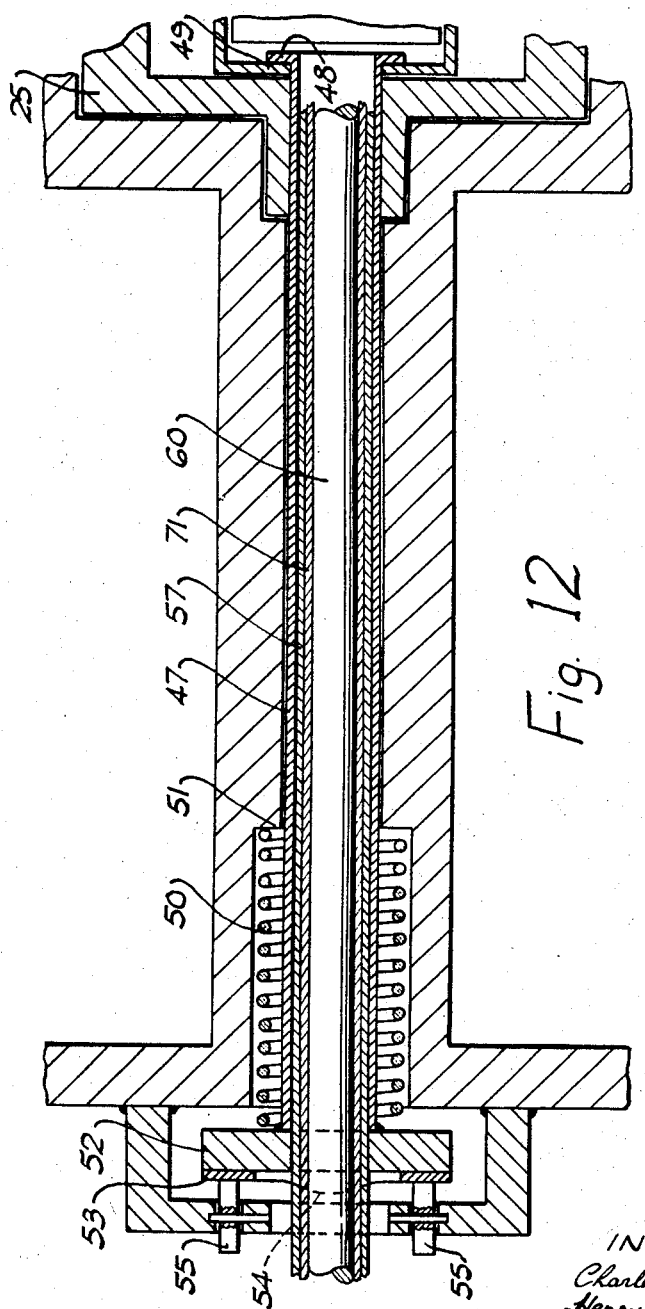
Figure 12 is a fragmentary sectional elevation showing mechanism by means of which the blade is held against sliding motion whilst it is being rotated.

It is also necessary to ensure that whilst said machine spindle 25 is undergoing its intermittent rotation by means of the intermittent connection between the mutilated gear 41 and the gear 42, said slide 22 is prevented from sliding. The mechanism by means of which this is achieved is illustrated in Figure 12, which shows that the machine spindle 25 is of hollow configuration, through which is passed a hollow locking rod 47. Said locking rod is formed at that end nearer to the slide 22 with a laterally projecting flange 48 adapted to engage with a corresponding laterally projecting flange 49, provided in the blade mounting head. If said locking rod 47 is forced axially with respect to the machine spindle 25 in such a direction to cause said pair of flanges 48 and 49 to come into engagement with each other, the slide 22 will be moved axially with respect to the machine spindle so as to be clamped tightly into engagement therewith, thus locking it in a position in which sliding motion is prohibited. Said locking rod 47 is spring loaded by means of a compression spring 50 mounted between a shoulder 51 provided in the spindle 25 and an end plate 52 connected to the end of the control rod 47, the arrangement being such that said locking rod 47 is normally urged in a direction in which the aforementioned locking action between the flanges 48 and 49 takes place. For arranging periodic release of said locking arrangement, the outermost side of the end plate 52 is provided with a circular cam track 53 having a pair of diametrically opposed cams 54 which are adapted to be engaged with a pair of rollers 55, the axis of rotation of each of such rollers 55 being relatively fixed. The arrangement is such that as the machine spindle 25 rotates, the end plate 52, together with its associated cam track 53, is periodically brought into engagement with the rollers 55, at which time the locking rod 47 will be forced inwardly against the pressure of the spring 50 so as to relieve the pressure between the slide 22 and its associated slideway, thus allowing the slide to move. Thus we have an arrangement in which the blade is given intermittent sliding motions and intermittent rotary motions wherein the blade is prevented from sliding whilst turning and prevented from turning whilst sliding.

As above mentioned, the stroke of the slide 22 is variable in order to vary the width of the aerofoil section being machined. It is, however, necessary to arrange for other movements to be given to the blade in order to produce the various characteristics desired. Arrangements for obtaining these characteristics will now be described, for which purpose said characteristics may be defined as eccentricity, twist, and centralisation.

With regard to eccentricity, the need for this arises because the blade may be unevenly tapered on each side. In other words, the blade may be provided with a different degree of taper with respect to the centre line on each side of the blade. Thus the leading edge section may be tapered to a different degree from the trailing edge section. This is achieved by means of providing a further slide 56 (see Figure 7) which operates within the slide 22 and which is arranged to move in a direction parallel to said slide 22.

Figure 16:
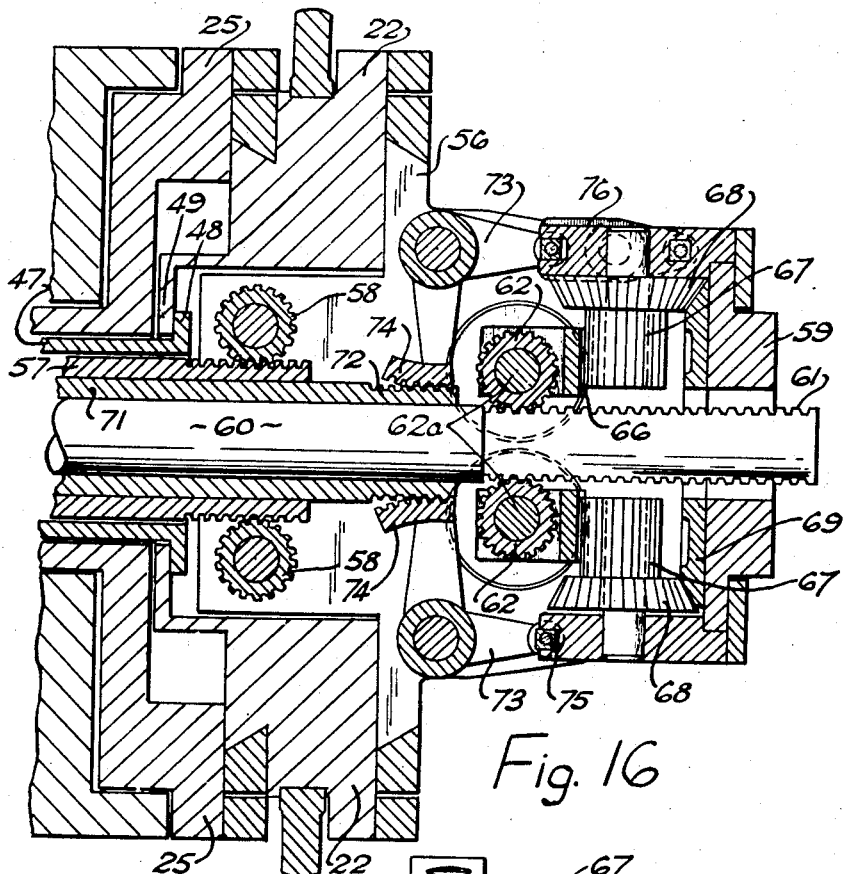
Figure 16 is a fragmentary sectional elevation, being a section through one of the blade mounting heads and showing the mechanism by means of which movements of the blade are controlled.

The slide 56 is controlled by means of a control rod 57 (see Figure 16) which also passes through the hollow centre of the machine spindle 25, said control rod 57 being concentric with and lying next to the locking rod 47 previously mentioned. The control rod 57 is also of hollow configuration and is formed at that end adjacent the blade mounting with a number of teeth which may, as shown in Figure 16, be disposed on diametrically opposite sides of the control rod 57 or alternatively, may be formed in effect as grooves running circumferentially around the end of the rod so as to provide in effect a circular rack. Within the slide 22 there is provided a pair of long pinions 58 which are adapted to engage with the teeth or rack formed on the control rod 57 so that the movement of said rod inwardly and outwardly will cause corresponding rotation of the long pinions 58. The two ends of each pinion 58 (which is axially located in slide 22) are provided with screw threaded portions engageable with a screw thread formed in a housing connected to the slide 56, so that rotation of the pinions 58 will have the effect of moving the slide 56 relative to slide 22. As previously mentioned, the slide 56 operates in a direction parallel to the direction of movement of slide 22 so that as slide 56 is moved relative to slide 22 the centre of stroke of slide 56 and with it the centre of stroke of the blade section with respect to the axis of the machine spindle will be shifted laterally to one side or the other and such shifting can be achieved whilst the machine is running by means of connecting the other end of the control rod 57 to a follower which is arranged to co-act with a grooved cam (not shown) which is also mounted in the same cam control slide 36 in which the aforementioned cam 35 is mounted.

It will be realised that as the pinions 58 are relatively long ones, the reciprocating motion of the slide 22 can take place with the teeth on the control rod 57 maintaining constant engagement with the pinions 58. As previously mentioned, the cam control slide 36 is connected to the traversing movement of the tool (which connection will be hereinafter described) so that as the tool travels along the length of the aerofoil section the cam control slide 36 will be moved so as to effect axial movement of the control rod 57 via the follower connected to one end thereof so as to move slide 56 and provide for eccentricity of taper throughout the length of the aerofoil section. Thus the eccentricity will be variable throughout the length of the aerofoil section in accordance with the requirements of the blade designer. The connection between one end of the control rod 57 and the corresponding cam in the cam control slide 36 may be effected in a manner similar to that existing between the control rod 29 and the cam 35, i.e. by means of providing two pairs of rollers which trap a terminal flange provided on a spigot projecting from the end of the control rod.

With respect to twist, it will be understood that the configuration of the blade may be such that the chord or width of any given cross section is rotated or twisted through some angle with respect to another cross section spaced therefrom so that the whole length of the areofoil section is twisted. Such twist is imparted to the blade by arranging that the blade mounting head at each end of the blade is rotatable with respect to the axis of the machine spindle 25, and to this end the blade fixture adapted to hold the end of the blade is mounted on a rotatable face plate 59 (see Figure 7) which face plate is in turn mounted on the slides 70, 22 and 56 aforesaid.

Figure 17:
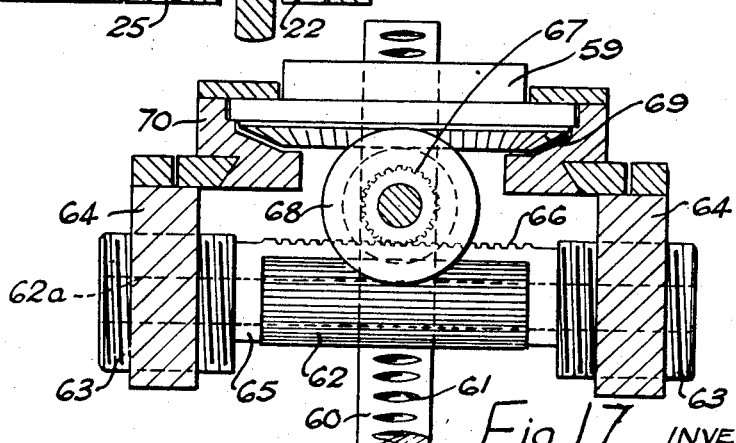
Figure 17 is a plan view showing part of the mechanism depicted in Figure 16.

Said rotatable face plate 59 is controlled by means of a further control rod 60, which is in the form of a solid rod passed through the centre of the hollow machine spindle 25 and provided with grooves or teeth 61 at one end thereof. As will be seen from Figures 16 and 17, the teeth of said control rod 60 engage with a pair of long pinions 62, the upper pinion 62 being shown in the plan view of Figure 17. Each pinion 62 is mounted on a spindle and provided at either end with a screw threaded portion 63 operating in a screwed housing 64. The pinion 62 and portions 63 at either end thereof are rigidly mounted on a spindle 62A and the ends of a yoke 65 are trapped between the ends of the pinion 62 and the positions 63 so that axial movement of the spindle 62A effects movement of the yoke 65 on which are provided rack teeth 66 engaging with a pinion 67. Each pinion 67 has secured thereto a concentrically mounted bevel pinion 68 and the two bevel pinions 68 are adapted to engage with a further bevel pinion 69 to which the rotatable face plate 59 is connected. Thus the arrangement is such that axial movement of the control rod 60 will cause rotation of the long pinions 62 which in turn produce lateral movement of the yoke 65. Said lateral movement of the yoke will rotate the pinions 67 and with them the bevel pinions 68 so that the face plate 59 is rotated. The control rod 60 is provided at its other end remote from the blade mounting with a terminal laterally projecting flange and is also connected to a follower mounted in the groove of a further cam (not shown) provided in the cam control slide 36. Thus, as the tool slide travels along the length of the aerofoil section the cam control slide 36 is moved also and the control rod 60 will be given an appropriate axial movement according to the configuration of the corresponding cam groove. In this way the twist of the aerofoil section is varied along the length thereof, it being understood that the mounting at each end of the blade is given a similar movement by means of the connection between the two blade mountings, as will hereinafter be described.

Figure 26:
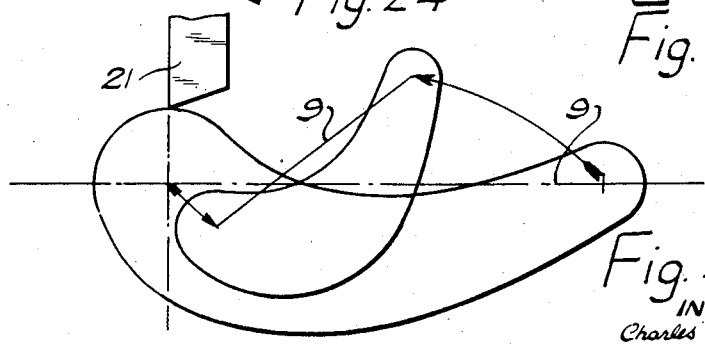
Figure 26 is a schematic view depicting the necessity for blade centralisation.

One further movement is given to the blade and this is that referred to above as centralisation. This movement is necessary because during the aforementioned motions to produce the twist and eccentricity the line connecting the centres of the leading edge radius and the trailing edge radius (which line is parallel to the sliding motion of the blade) may have been moved out of alignment with the machine spindle axis. Thus the centralisation motion is necessary to restore said line connecting the centres of the trailing and leading edge radii to a position in which it again coincides with the machine spindle axis. This is illustrated in Figure 26, which shows the line 9 connecting the radii aforesaid displaced from its aligned position. The centralisation movement is arranged by providing a further slide 70 which is adapted to move in a direction at right angles to the directions of movement of the slides 56 and 22. Thus the rotatable face plate 59 is mounted on said slide 70 and the latter is controlled by a further control rod 71 also passing through the centre of the hollow machine spindle 25. The control rod 71 is of tubular configuration and lies between the previously mentioned control rods 57 and 60, being mounted concentrically therewith. Said control rod 71 is also provided with rack-like teeth 72 at one end and a laterally projecting terminal flange at the other, said flange being connected as before to a follower engaging with a further cam which is also mounted in the cam control slide 36 so that the control rod 71 will be given axial movement as its follower moves in the corresponding cam groove when the cam control slide 36 moves as the tool traverses along the length of the aerofoil section. The teeth 72 on the control rod 71 engage with a pair of bell crank levers 73, each of said bell crank levers having a toothed quadrant 74 on one arm and the other arm connected to the slide 70 so that inward or outward movement of said control rod 71 results in movement of the slide 70 in a direction at right angles to the movement of slides 22 and 56. The connection between the lower bell crank lever 73 as seen in Figure 16 is by means of a sliding block 75 connected directly to the slide 70 but between the upper bell crank lever 73 and the slide 70 is interposed a further pivoted link 76 which has the effect of reversing the movement of the horizontal arm of said upper bell crank lever so that it acts in the same direction as the lower bell crank lever as the control rod 71 is moved in and out.

Thus, so far as the movements of the blade are concerned it will be understood that through the hollow centre of the machine spindle 25 are passed three control rods, namely, rods 57, 60 and 71, controlling respectively the eccentricity, the twist, and centralisation of the blade. Said hollow machine spindle 25 also contains the locking rod 47 for preventing the sliding motion of the blade whilst it is turning; the hollow driving shaft contains the other control rod 29 and the four cams associated with the four control rods, namely, cam 35 and the three cams connected to the three control rods 57, 60 and 71 are all mounted in the cam control slide 36, which, as previously stated, is connected to the tool slide so that the movements imparted to the blade can be varied as the tool traverses along the length thereof.

Figure 21:
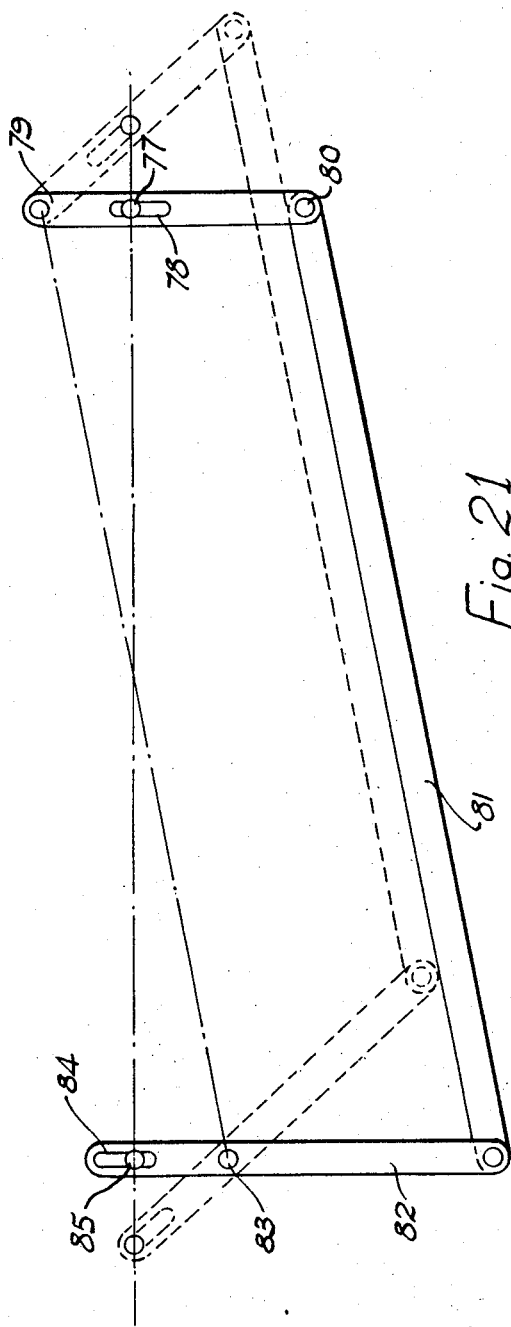
Figure 21 is a diagrammatic view showing the connection between the blade control rods of the two blade mounting heads in which the two ends of the blade are mounted.

As previously indicated, the blade is mounted at either end in a blade mounting and the arrangements at each end are similar to each other, there being the same number of control rods in each blade mounting. The pairs of control rods (e.g. the twist control rod at one end and corresponding control rod at the other end) are connected together by means of a system of levers, one such linkage being diagrammatically illustrated in Figure 21. Thus, referring to Figure 21, each control rod at one end of the machine is provided with a laterally projecting stud 77 engaging in an elongated slot 78 provided in a pivoted link 79. One end of said pivoted link 79 is pivotally connected at 80 to a further link 81, in turn pivotally connected to another link 82. Link 82 is pivoted about the fulcrum 83 and is provided at its upper end with an elongated slot 84, in which engages a stud 85 which projects from the side of the corresponding control rod at the other end of the machine. Thus there is provided a system of parallel links so that the movement of the control rod and associated stud 77 at one end of the machine will result in an equal movement of the corresponding control rod and associated stud 85 at the other end of the machine. In this way the necessity for connecting the control rods at each side of the machine to the cam control slide is avoided, the motions at one end being transferred mechanically through linkages, as above described, to the control rods at the other side.

Thus the movements of the blade are controlled in six different ways. These are, firstly, the reciprocating sliding motion effected by means of the connecting rod 26 and slide 22 driven from the main driving shaft; secondly the two turning movements effected by the intermittent rotating mechanism illustrated in Figures 8 to 11, in which turning movements the two edges of the blade are machined; thirdly, the width of the blade is variable by arranging for variable stroke of the reciprocating slide 22 by means of the control rod 29 so as to produce a tapered blade; fourthly, the taper can be arranged to be offset with respect to the centre line of the blade by means of varying the central position of the slide 56 with respect to the machine spindle axis by means of the control rod 57; fifthly, the aerofoil section can be twisted to give the desired twist characteristic by means of movement of the control rod 60 connected to the rotatable face plate 59, and sixthly, owing to the displacement that occurs in the abovementioned motions to produce twist and eccentricity, the blade is arranged to be centralised by means of the control rod 71 and the slide 70. All the above motions, with the exception of the first two (i.e. the reciprocating sliding motion and the turning motions) are produced by means of the four cams mounted in the cam control slide 36.

Tool movements

As above described, the machine is adapted to give certain motions to the blade during the machining operations. It will, however, be necessary to give certain movements to the tool if the blade is to be machined as required.

Firstly, it is, of course, necessary to produce the aerofoil section with a convex side and a concave side. The tool itself as used in the machine described is a single point cutting tool 21, illustrated in Figures 28 and 29, said tool having a rounded cutting edge 86, which is a circular arc described about a centre 87. The reproduction of the convex and concave shapes of the aerofoil section is achieved by causing said tool 21 to move in a direction which is transverse to the plane of reciprocation of the blade so that, for example, as the blade in its sliding or reciprocating motion is passed beneath the tool 21 in a generally horizontal direction said tool is given an up and down motion in a generally vertical direction so that the convex form is given to one side of the blade and concave form to the other side. Such up and down movement is effected by mounting said tool 21 in a slide 88 provided with a follower 89 which engages a barrel shaped cam 90, which is rotated about a horizontal axis so that as the blade is passed beneath the tool 21 in its reciprocating motion the tool is given the desired vertical reciprocating motion through the action of the aforementioned barrel shaped cam 90, now referred to as the aerofoil cam. Said aerofoil cam 90 is designed from the aerofoil shape of the blade and is rotating continuously about a horizontal axis at a speed which is half that of the main driving shaft 28. As the blade is rotated through 180° by means of the intermittent rotating mechanism previously described, so as to machine either the trailing edge section 13 or the leading edge section 12 and is not rotated during the two sliding motions, the ratio of blade revolution to main driving shaft revolution is one to two. Thus the periphery of the aerofoil cam 90 at any one section may be considered as being divided into four parts, each part subtending an angle of 90° at the centre of the cam. Two of said parts are related to the convex and concave sides of the aerofoil section of the blade respectively and the other two parts are related to the shape of the leading edge section and the trailing edge section so that said two edge sections may be formed to any desired shape, which may, for example, be other than circular. In this way the shape of the concave or convex side of the blade is spread over a quarter of the periphery of the aerofoil cam 90 and thus enables said cam 90 to be constructed in such a manner that the follower 89 can easily follow the rotating cam in order to produce the desired aerofoil section. Thus, as the tool is caused to traverse along the length of the aerofoil section of the blade the aerofoil cam 90 is continuously controlling the vertical reciprocation of the tool 21 in order to produce the desired aerofoil shape on the blade.

Figure 30:
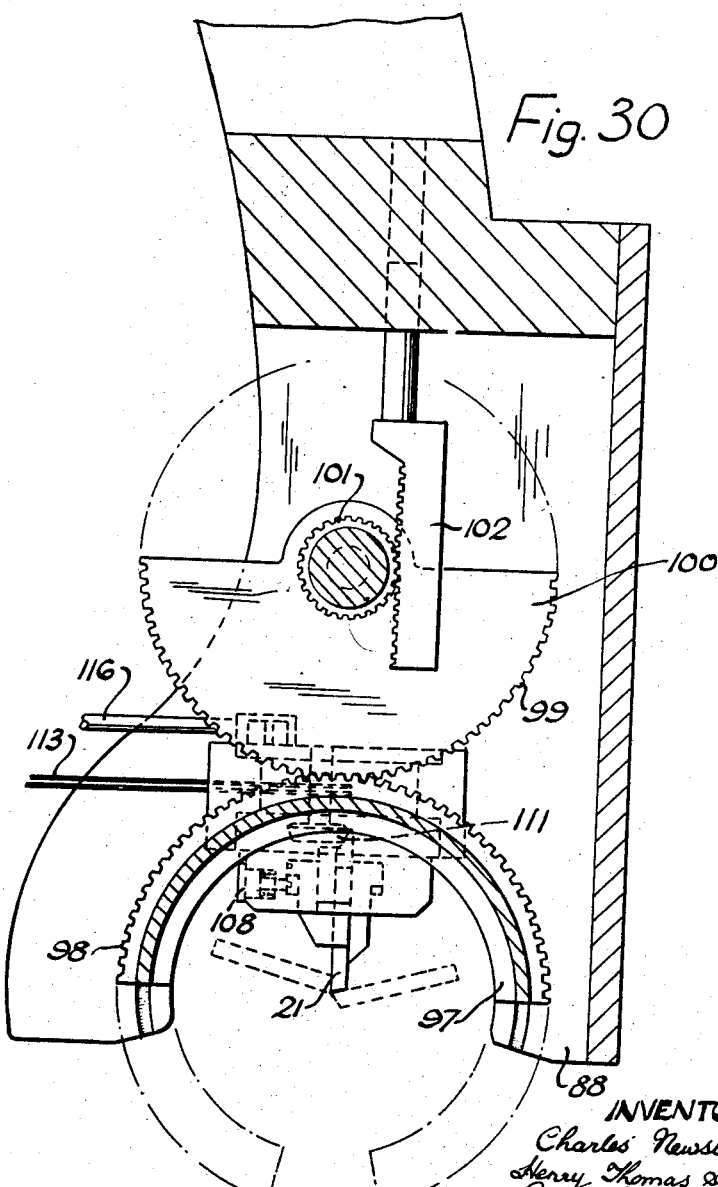
Figure 30 is a fragmentary sectional side elevation showing the tool mounting in the tool slide.

As previously described, the cutting tool 21 is a single point cutting tool having a cutting edge of part-circular configuration. As the tool is given its vertical reciprocation by means of the aerofoil cam 90 in order to produce the aerofoil shape on the blade, it will be necessary to alter the orientation of the tool during each cycle of blade movement in order that the tool should be presented to the work at the correct machining angle. Thus, referring to Figure 27, three positions of the blade are indicated by reference numerals 91, 92 and 93, and three corresponding positions of the tool are indicated by reference numerals 94, 95 and 96. From this figure it will be seen that it is necessary to rock the tool 21 about a horizontal axis if the correct cutting angle is to be maintained and such an operation will be referred to as "front rake control." This is achieved by mounting said tool 21 on its main slide 88 in a sub-slide 97 (see Figure 30) which can pivot with respect to said main slide 88. To this end said sub-slide 97 is formed to a part-circular configuration provided with a number of gear teeth 98 on its outer periphery. Said gear teeth 98 engage with teeth 99 provided on a part-circular control wheel 100, which is rigidly connected to a pinion 101. Said pinion 101 is engageable by a rack 102 which is controlled by a further cam called the front rake control cam (not shown), which may be either mechanically connected to said rack 102 by means of a follower such as a roller, or alternatively, may be connected thereto by means of a servo-mechanism incorporating, for example, hydraulically operated valves. Thus, during each cycle of movement of the blade (i.e. the basic two sliding motions and the two turning motions) the tool 21 will be given the up and down movement necessary to produce the aerofoil shape by means of the aerofoil cam 90 and will be rocked about a horizontal axis so as to present the correct cutting angle, this movement being controlled by the front rake control cam. It will be understood that said front rake control cam may be mounted in any convenient position on the machine in accordance with the type of connection that is to be made between said cam and the rack 102, and that the front rake cam rotates at the same speed as the aerofoil cam.

The main or tool carrying slide 88 in which the tool is mounted is traversed along the length of the aerofoil section by any suitable means such as a hydraulic drive and in this way machining of the whole aerofoil section is achieved.

At the ends of the aerofoil section are further sections, namely, the tip platform and the root platform, which also have to be machined and said two platforms merge with the aerofoil section by means of the tip end fillet radius and the tip end triangle on the one hand and the root end fillet radius and the root end triangle on the other hand.

Owing to the fact that either or both of said platforms may be tilted with respect to the centre line of the aerofoil section, there will be an area at each end of the aerofoil section called the tip end triangle and the root end triangle respectively, and in order to enable the tool to machine these two triangles as the blade passes therebeneath, it will be necessary to arrange that the blade and tool are displaced periodically with respect to each other in a direction parallel to the length of the blade by a distance equal to the base of such triangle. This is achieved by providing at each side of the machine a rotating cam 104 which is of sleeve-like configuration and adapted to engage a follower 105, such as a hydraulic tracer valve provided on each side of the tool carrying slide 88, the follower controlling, for example, a hydraulic system which causes the slide 88 to be displaced sideways once during each cycle of movement of the blade by a distance equal to the base of the tip end triangle or root end triangle as the case may be. During this time it will be understood that the tool 21 is still under the control of the aerofoil cam controlling the vertical reciprocation of the tool as the latter is traversed horizontally along the blade.

When the triangle at one end of the blade has been machined, the corresponding cam 104 controlling the machining of the triangle is withdrawn so that the follower 105 now engages a further cam in the form of a face cam 106.

The machining of part of the fillet radius lying between the triangle and the platform may be controlled by the aerofoil cam but the machining of the platform at either end of the blade and the remaining part of the fillet radius is controlled as aforesaid by means of the appropriate face cam 106 which is rotated about a horizontal axis. As the follower 105 engages the appropriate face cam 106 the main slide 88 is given an upward traversing motion so that the machining of the platform can be completed. Such upward traversing motion can conveniently be achieved by hydraulic means brought into operation automatically at the correct position when the tool carrying slide 88 has finished the horizontal traversing motion.

Figure 22:
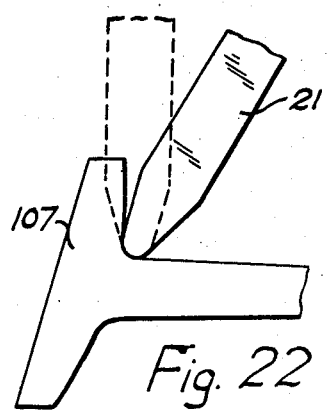
Figures 22 and 23 are schematic views showing the necessity for giving a single point cutting tool side inclination as a platform of the blade is being machined.
Figure 23:
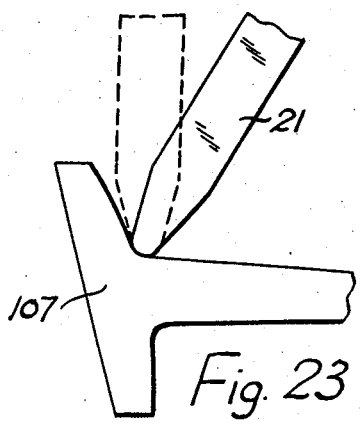

During the machining of the fillet radius and the platform as aforesaid at each end of the blade, it may be necessary to tilt the tool about a horizontal axis extending at right angles to the axis of the machine spindle 25 and passing through the centre of curvature 87 of the cutting edge of the tool 21 in order to allow said tool to machine effectively the whole area of the fillet radius and platform. The necessity for such side inclination is illustrated in Figures 22 and 23, which show the tool 21 commencing the machining of a platform 107 of a blade. This side inclination is effected by mounting the tool 21 in its holder (see Figure 31) so that the tool may be tilted about the axis aforesaid in order to give it the necessary inclination. The side inclination is controlled in any convenient manner, such as for example, by electro-mechanical means in the form of an electrically operated solenoid which can be brought into operation at the desired time so as to cause the tool to be swung over into its appropriate inclined position. Once in the inclined position the tool can be locked by means of a spring-loaded plunger 108 entering into a corresponding hole or recess provided in the tool box. As shown in Figure 31, three such plungers 108 are provided, these corresponding to the upright position of the tool 21 and the two inclined positions thereof, one for each end of the blade. The final connection between the solenoid or other control means and the tool mounting is effected by means of providing a pulley 109 mounted on a spindle 110 provided at its lower end with a bevel gear 111. Said bevel gear 111 meshes with a toothed quadrant 112 provided on the tool box so that movement of a cable 113 passed around the pulley 109 (such movement of the cable being effected, for example, by the solenoid above mentioned) will rotate the bevel gear 111 and the co-acting quadrant 112 to tilt the tool into the required position, in which position it will be locked by one of the plungers 108 aforesaid.

Thus the tool 21 is controlled by the aerofoil cam 90 and front rake control cam to machine the aerofoil section; is controlled by a cam 104 to enable the two triangles to be machined, as aforesaid; is given a side inclination, as above described, at the appropriate time, and is also controlled at each end of the blade by a face cam 106 so as to reproduce the desired shape on the platform at each end of the blade.

Figure 24:
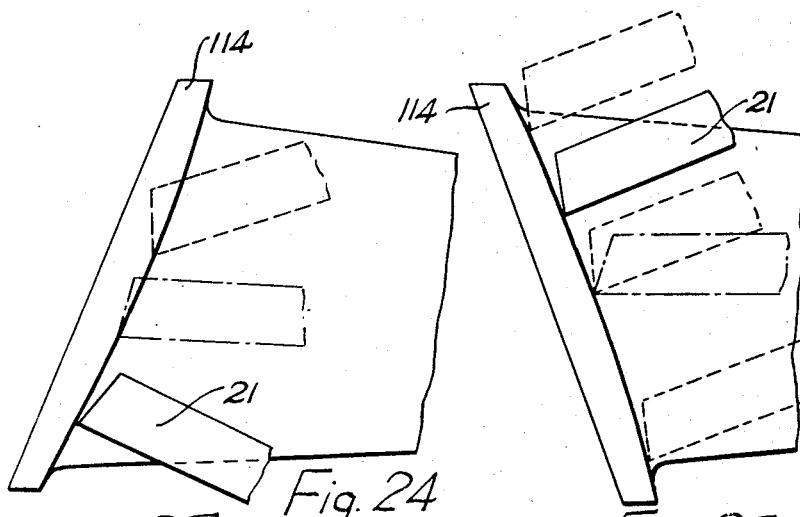
Figures 24 and 25 are schematic views showing the necessity for giving variable side rake to the tool as a blade platform is being machined.
Figure 25:
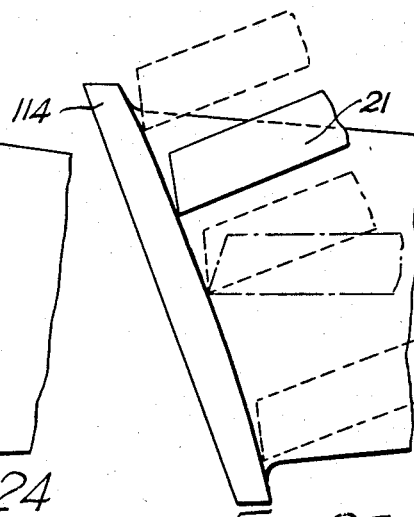

One further motion has to be given to the tool and this is for the purpose of controlling the side rake. The necessity for such side rake is illustrated in Figures 24 and 25, which are plan views showing that owing to the inclination of the platform 114, the tool 21 has to be rocked about a vertical axis passing through the centre of curvature 87 of its cutting edge. This side rake control is achieved by providing a pair of side rake control cams 115 (see Figure 1), one for each end of the blade, said cams 115 being mounted in any convenient position on the machine and rotated about a horizontal axis, connection between the cams and the tool 21 being effected by any convenient remote control means, such as, for example, by a further pair of tracer valves (not shown) and corresponding hydraulic servo-mechanism.

The final connection between the side rake control cams 115 and the tool 21 is achieved by a pair of hydraulic pipe lines 116, serving to admit fluid to one or the other of a pair of pistons 117, the pistons being connected to a member provided with a projecting stud 118 engaging in a slot 119 formed in a plate 120 provided at the upper end of the tool box so that movement of the pistons 117 to one side or the other will have the effect of rotating the plate 120 and the tool 21 about the aforementioned vertical axis.

Thus the movements of the tool are controlled by the aerofoil cam 90, a front rake control cam (not shown), a pair of side rake control cams 115, a pair of platform face cams 106, and a pair of cams 104 controlling the machining of the two triangles, said tool also being given the appropriate side inclination at each end of the blade.

Thus movement of the tool superimposed upon the movements of the blade as above described enable the whole surface of the blade, excluding the outer surfaces of the two platforms, to be machined in one machine and in one machining operation. It will be understood that the tool may be given several traverses or cuts across the blade in order to remove the required amount of metal and in order to produce the finish required, the number of cuts and depth of each cut being controlled, if desired, automatically.

Further, the cutting tool as above described may be followed or preceded by other tools, such as for example, a die having an abrasive carrying endless band for polishing and finishing a workpiece.

It will be understood that a turbine blade as above described may be produced from stock in the form, for example, of round bar, although it may be more convenient to start with a blank which has been rough forged to the approximate shape desired.

*Co-ordination between blade and tool movements*

As has been previously mentioned, the movements of the tool and the blade are co-ordinated so that, for example, the correct degree of twist is given to the blade at any particular section along the length thereof. This is achieved by mounting the four cams controlling respectively the width, eccentricity, twist, and centralisation of the blade in the common cam control slide 36 which is connected to the main tool slide 88 so that as the latter is traversed along the length of the blade the cam control slide 36 is moved correspondingly so as to cause relative movement between each of the four cams aforesaid and their respective followers controlling the movements of the various control rods.

Figure 20:
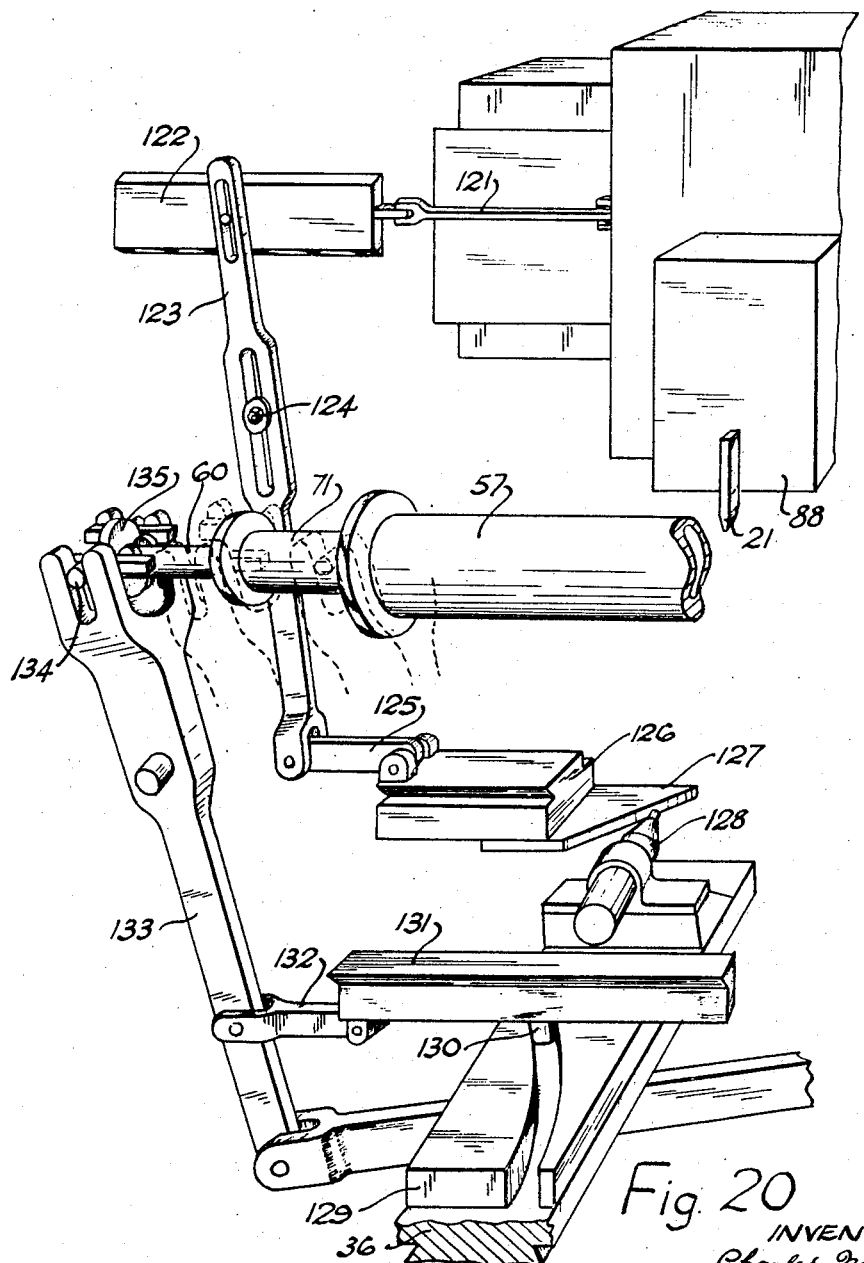
Figure 20 is a schematic perspective view showing the connection between the tool slide and the cam control slide carrying the cams controlling the movements of the blade.

Referring now to Figure 20, which shows schematically the tool slide 88 and the cam control slide 36, connection between the two slides is achieved by means of a link 121 actuating in slide 122 to which is connected by means of a pin and slot connection, a further pivoted link 123 pivoting about an adjustable fulcrum 124. The other end of the pivoted link 123 is connected by a further link 125 to another slide 126 carrying a wedge shaped member 127 engaging a hydraulic tracer valve 128. Said hydraulic tracer valve 128 is connected by an appropriate hydraulic circuit to the cam control slide 36 so that as the tool carrying slide 88 moves in a horizontal direction, the pivoted link 123 is caused to pivot about its fulcrum 124, thus actuating the hydraulic tracer valve 128 so as to cause the cam control slide 36 to move.

As shown in Figure 20, the cam control slide 36 carries a groove cam 129, with which engages a follower 130 connected to a slide 131 which is connected by a link 132 to a further link 133, which is in turn connected by means of two pairs of rollers 134, trapping a terminal lateral flange 135 of one of the control rods, which, in this case, is the innermost control rod 60 governing the twist of the blade.

Connections between the other control rods issuing from the hollow machine spindle, namely, control rods 71 and 57 and the corresponding cams mounted in the cam control slide 36 are effected in a similar manner so that as the tool carrying slide 88 traverses along the length of the blade the cams mounted in the cam control slide, namely, the three cams connected to the three control rods 60, 71 and 57, and the cam 35 controlling the control rod 29 control the configuration of the aerofoil section of the blade.

*Cams*

Thus the machine as above described makes use of 12 cams. These are the four cams mounted on the cam control slide 36, as above described, each of these cams being of a simple two-dimensional nature, being formed as grooves in flat plates. Three further cams, namely, the pair of side rake control cams 115 and the front rake control cam controlling the movements of the tool are also of relatively simple design. Also, the pair of cams 104 controlling the machining of the two triangles may be of comparatively simple design. The other three cams, namely, the aerofoil cam 90 and the pair of face cams 105 controlling the machining of the two blade platforms are three-dimensional cams which are designed from the particular blade being machined. Each of these cams may be interchangeable so as to produce blades of varying characteristics. As there are 12 cams, controlling the whole configuration of the blade, it will be understood that a comparatively small stock of each cam will enable a great variety of blades to be produced. Preferably the arrangement is such that the four cams mounted in the cam control slide 36 are designed to a common base length, for example, 10", so that these cams can be easily interchanged. Variation in length of the blade will, of course, be controlled by the traversing movements of the tool carrying slide 88 and provision is made, as previously mentioned, for adjusting the fulcrum 124 of the pivoted link 123 so that varying multiplications can be obtained between the movements of said slide 88 and the slide 126 controlling the movement of the cam control slide 36.

Thus, the very complex shape of a turbine blade has been broken down into a number of different and separate characteristics, which are each controlled by a cam interchangeable with other cams so as to produce blades of different characteristics.

Although the machine as above described has been related to the machining of a turbine blade, it will be understood that articles of complex shape other than turbine blades might be produced on such a machine. Further, where, for example, it is desired to produce a generally three-sided article, the three sides being connected by radiused edges, the intermittent rotating gear would be arranged to turn the article through 120° instead of 180° between two successive reciprocating strokes, and in this case appropriate alterations would be made to the form of the mechanism for producing such intermittent rotation, the teeth on the mutilated gear extending, in this instance, over 120° of the circumference instead of 180°.

What we claim is:

1. A profiling machine for machining an elongated article such as a turbine blade (hereinafter referred to as a blank) comprising a pair of spaced blank mounting slides adapted to support opposite ends of the blank, a tool carrying slide, means for traversing said tool carrying slide between the pair of blank mounting slides in a direction parallel to the length of the blank, a driving shaft, a pair of connecting rods eccentrically connected to said driving shaft and to said pair of blank mounting slides, a stroke control rod passed through the interior of said driving shaft, means for displacing said stroke control rod axially of the driving shaft so as to vary the eccentricity of the connecting rods, said blank mounting slides being simultaneously movable by means of said connecting rods in a direction which extends substantially at right angles to the length of the blank and means for effecting simultaneous rotational movement of said blank mounting slides at the end of each stroke of translational movement through substantially half a complete revolution about an axis substantially parallel to the length of the blank.

2. A profiling machine for machining an elongated article such as a turbine blade (hereinafter referred to as a blank) comprising a pair of spaced blank mounting slides adapted to support opposite ends of the blank, a tool carrying slide, means for traversing said tool carrying slide between the pair of blank mounting slides in a direction parallel to the length of the blank, a driving shaft, a pair of connecting rods eccentrically connected to said driving shaft and connected to said pair of blank mounting slides so as to be adapted to effect simultaneous translational movement of said blank mounting slides in a direction extending substantially at right angles to the length of said blank, a stroke control rod extending through the hollow centre of said driving shaft, a pair of spaced parallel surfaces provided on said stroke control rod and each inclined to the axis of said driving shaft, a pair of fingers mounted on the driving shaft for movement in a direction transverse to the axis thereof, said fingers being connected to the pair of connecting rods so that axial movement of said stroke control rod varies the eccentricity of connection between said connecting rods and said driving shaft, and means for effecting simultaneous rotational movement of said blank mounting slides at the end of each stroke of translational movement through substantially half a complete revolution about an axis substantially parallel to the length of the blank.

3. A profiling machine for machining an elongated article such as a turbine blade ( hereinafter referred to as a blank) comprising a pair of hollow spindles, a pair of spaced blank mounting slides adapted to support opposite ends of the blank and mounted on said hollow spindles, a second slide interposed between each blank mounting slide and the blank when mounted, a third slide interposed between each of said second slides and the blank when mounted, a face plate interposed between each of said third slides and the blank when mounted, a tool carrying slide, means for traversing said tool carrying slide between the pair of blank mounting slides in a direction parallel to the length of the blank, means for effecting simultaneous translational movement of said blank mounting slides in a direction which extends substantially at right angles to the length of said blank, means for effecting simultaneous rotational movement of said blank mounting slides at the end of each stroke of translational movement through substantially half a complete revolution about an axis substantially parallel to the length of the blank, three control rods extending through the hollow centre of each hollow spindle and connected respectively to each of said second slides, each of said third slides, and each of said rotatable face plates, each of said second slides being adapted to move in a direction parallel to the direction of movement of the blank mounting slides, each of said third slides being adapted to move in a direction substantially perpendicular to the direction of movement of said blank mounting slides and each of said rotatable face plates being adapted to be rotated about an axis parallel to the direction of traverse of the tool carrying slide.

4. A profiling machine for machining an elongated article such as a turbine blade (hereinafter referred to as a blank) comprising a pair of hollow spindles, a pair of spaced blank mounting slides adapted to support opposite ends of the blank and mounted on said pair of hollow spindles, a second slide interposed between each of said blank mounting slides and the blank when mounted, a third slide interposed between each of said second slides and the blank when mounted, a face plate interposed between each of said third slides and the blank when mounted, a tool carrying slide, means for traversing said tool carrying slide between the pair of blank mounting slides in a direction parallel to the length of the blank, means for effecting simultaneous translational movement of said blank mounting slides and in a direction which extends substantially at right angles to the length of said blank, means for effecting simultaneous rotational movement of said blank mounting slides at the end of each stroke of translational movement through substantially half a complete revolution about an axis substantially parallel to the length of the blank, three control rods passed through the hollow centre of each hollow spindle and connected respectively to one of said second slides, one of said third slides and one of said face plates so as to be adapted to move the second slide in a direction parallel to the direction of movement of each blank mounting slide, to move said third slide in a direction substantially perpendicular to the direction of movement of said blank mounting slide and to rotate said face plate about an axis parallel to the direction of traverse of the tool carrying slide, a cam control slide, three cams mounted in said cam control slide and connected respectively to the three control rods passing through one of said hollow spindles, said cam control slide being connected to the tool carrying slide so as to be movable by the traversing movement of said tool carrying slide, the arrangement being that movement of the cam control slide whilst the machine is running effects movement of a control rod through the intermediary of the corresponding cam, the two sets of control rods on either side of the machine being connected so that movement of one set effects corresponding movement in the other set.

5. A profiling machine for machining an elongated article such as a turbine blade (hereinafter referred to as a blank) comprising a pair of hollow spindles, a pair of spaced blank mounting slides adapted to support opposite ends of the blank and mounted on said pair of hollow spindles, a second slide interposed between each of said blank mounting slides and the blank when mounted, a third slide interposed between each of said second slides and the blank when mounted, a face plate interposed between each of said third slides and the blank when mounted, a tool carrying slide, means for traversing said tool carrying slide between the pair of blank mounting slides in a direction parallel to the length of the blank, means for effecting simultaneous translational movement of said blank mounting slides and in a direction which extends substantially at right angles to the length of said blank, means for effecting simultaneous rotational movement of said blank mounting slides at the end of each stroke of translational movement through substantially half a complete revolution about an axis substantially parallel to the length of the blank, three control rods passed through the hollow centre of each hollow spindle and connected respectively to one of said second slides, one of said third slides and one of said face plates so as to be adapted to move the second slide in a direction parallel to the direction of movement of each blank mounting slide, to move said third slide in a direction substantially perpendicular to the direction of movement of said blank mounting slide and to rotate said face plate about an axis parallel to the direction of traverse of the tool carrying slide, a cam control slide, four cams mounted in said cam control slide, three of said cams being adapted to actuate the three control rods passing through one of said hollow spindles and the fourth cam being adapted to control the length of stroke of each blank mounting slide, said cam control slide being connected to the tool carrying slide so as to be movable by the traversing movement of said tool carrying slide, the arrangement being that movement of said cam control slide whilst the machine is running effects movement of each control rod through the intermediary of the corresponding cam so as to form the blank to a predetermined configuration as the tool carrying slide traverses along the length of the blank.

6. A profiling machine for machining an elongated article such as a turbine blade (hereinafter referred to as a blank) comprising a pair of spaced blank mounting slides adapted to support opposite ends of the blank, a second slide interposed between each of said blank mounting slides and the blank when mounted, a third slide interposed between each of said second slides and the blank when mounted, a face plate interposed between each of said third slides and the blank when mounted, a tool carrying slide, means for traversing said tool carrying slide between the pair of blank mounting slides in a direction parallel to the length of the blank, means for effecting simultaneous translational movement of said blank mounting slides in a direction which extends substantially at right angles to the length of said blank, means for effecting simultaneous rotational movement of said blank mounting slides at the end of each stroke of translational movement through substantially half a complete revolution about an axis substantially parallel to the length of the blank, three control rods connected respectively to said second slide, said third slide and said face plate at each side of the machine, each of said second slides being movable in a direction parallel to the direction of movement of each blank mounting slide, each of said third slides being movable in a direction substantially perpendicular to the direction of movement of said blank mounting slides, each of said face plates being rotatable about an axis parallel to the direction of traverse of the tool carrying slide, at least one elongated pinion connecting each of said second slides and the corresponding control rod, at least one elongated pinion connecting each of said face plates and the corresponding control rod, the arrangement being that the connections between said second slides and said face plates and their corresponding control rods are maintained as the blank mounting slides undergo their translational movements.

7. A profiling machine for machining an elongated article such as a turbine blade (hereinafter referred to as a blank) comprising a pair of spaced blank mounting slides adapted to support opposite ends of the blank, a second slide interposed between each of said blank mounting slides and the blank when mounted, a third slide interposed between each of said second slides and the blank when mounted, a face plate interposed between each of said third slides and the blank when mounted, a tool carrying slide adapted to support a machining tool, means for traversing said tool carrying slide between the pair of blank mounting slides in a direction parallel to the length of the blank, means for effecting simultaneous translational movement of said blank mounting slides in a direction which extends substantially at right angles to the length of said blank, means for effecting simultaneous rotational movement of said blank mounting slides at the end of each stroke of translational movement through substantially half a complete revolution about an axis substantially parallel to the length of the blank, a rotating cam engageable by said tool carrying slide for effecting reciprocatory movement of said tool in a direction which extends at right angles to both the direction of traverse of said tool carrying slide and the direction of translation of the blank mounting slides, means for tilting said tool in the tool carrying slide about an axis tangential to the cutting edge of the tool and parallel to the direction of traverse of the tool carrying slide as the latter is traversed and as each blank mounting slide moves in its cycle of movement, means for tilting the tool about an axis parallel to the direction of translation of the blank mounting slides, means for imparting a reciprocating motion to the tool in a direction parallel to the direction of traverse thereof, means for continuously rotating the tool about an axis which extends at right angles both to the direction of traverse of the tool carrying slide and the direction of translation of the blank mounting slides, three control rods connected respectively to said second slide, said third slide and said face plate at each side of the machine, each of said second slides being movable in a direction parallel to the direction of movement of each blank mounting slide, each of said third slides being movable in a direction substantially perpendicular to the direction of movement of said blank mounting slides, each of said face plates being rotatable about an axis parallel to the direction of traverse of the tool carrying slide, at least one elongated pinion connecting each of said second slides and the corresponding control rod, at least one elongated pinion connecting each of said face plates and the corresponding control rod, a cam control slide connected to the tool carrying slide, and cams mounted in said cam control slide actuating the control rods, the arrangement being that the connections between said second slides and said face plates and their corresponding control rods are maintained as the blank mounting slides undergo their translational movements.

References Cited in the file of this patent
UNITED STATES PATENTS

| | | |
|---|---|---|
| 2,366,200 | Langhorst | Jan. 2, 1945 |
| 2,412,337 | Jackson | Dec. 10, 1946 |
| 2,826,123 | Leverington | Mar. 11, 1958 |